United States Patent
Fritsch et al.

(10) Patent No.: US 10,184,809 B2
(45) Date of Patent: Jan. 22, 2019

(54) SYSTEM FOR DETERMINING POSITIONS WITH A SENSOR USING A 2D-CODE PATTERN FOR DETERMINATION OF A DISCREPANCY FROM AN IDEAL SITUATION

(71) Applicant: HEXAGON TECHNOLOGY CENTER GMBH, Heerbrugg (CH)

(72) Inventors: Robert Fritsch, Balgach (CH); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 298 days.

(21) Appl. No.: 15/051,597

(22) Filed: Feb. 23, 2016

(65) Prior Publication Data
US 2016/0258786 A1    Sep. 8, 2016

(30) Foreign Application Priority Data
Mar. 6, 2015   (EP) .................................... 15157967

(51) Int. Cl.
*G01D 5/347*   (2006.01)
*G01D 5/244*   (2006.01)

(52) U.S. Cl.
CPC ....... *G01D 5/34746* (2013.01); *G01D 5/2449* (2013.01); *G01D 5/24476* (2013.01)

(58) Field of Classification Search
CPC ............. G01D 5/24746; G01D 5/2449; G01D 5/24476
See application file for complete search history.

(56) References Cited

U.S. PATENT DOCUMENTS

| | | | | |
|---|---|---|---|---|
| 4,587,622 A | * | 5/1986 | Herzog | G01B 5/0009 318/569 |
| 4,673,810 A | | 6/1987 | Babsch et al. | |
| 5,069,547 A | * | 12/1991 | Huggins | G01D 5/2497 250/237 G |
| 6,333,511 B1 | | 12/2001 | Talmi | |
| 7,525,085 B2 | | 4/2009 | Saidan et al. | |
| 8,434,690 B2 | | 5/2013 | Ushijima et al. | |
| 8,855,265 B2 | | 10/2014 | Engel et al. | |
| 2008/0291470 A1 | * | 11/2008 | Yun | G01B 11/002 356/616 |

(Continued)

FOREIGN PATENT DOCUMENTS

| | | |
|---|---|---|
| CH | 704 584 A2 | 9/2012 |
| CN | 1220019 A | 6/1999 |

(Continued)

OTHER PUBLICATIONS

European Search Report dated Sep. 14, 2015 as received in Application No. 15157967.9.

(Continued)

*Primary Examiner* — Que T Le
*Assistant Examiner* — Jennifer Bennett
(74) *Attorney, Agent, or Firm* — Maschoff Brennan

(57) ABSTRACT

System for determining positions along a direction of advance, having a first sensor, particularly a line sensor, having a scanning length (L) for scanning a first 2D pattern and producing a scan signal. The first 2D pattern has pattern elements that each form a first code word on at least one portion of the scanning length (L), which first code word codes a position along the direction of advance absolutely. In addition, the first code word can be taken as a basis for determining a deviation from an ideal position for the first sensor in relation to the first 2D pattern.

20 Claims, 8 Drawing Sheets

(56) References Cited

U.S. PATENT DOCUMENTS

| | | | | |
|---|---|---|---|---|
| 2011/0218760 | A1* | 9/2011 | Takahama | G01P 3/64 |
| | | | | 702/150 |
| 2012/0017453 | A1* | 1/2012 | Ogihara | G01B 21/045 |
| | | | | 33/503 |
| 2013/0139397 | A1* | 6/2013 | Jordil | G01B 21/047 |
| | | | | 33/503 |
| 2014/0007441 | A1* | 1/2014 | Pettersson | G01B 5/008 |
| | | | | 33/503 |

FOREIGN PATENT DOCUMENTS

| | | | | |
|---|---|---|---|---|
| CN | 101055195 | A | 10/2007 | |
| CN | 101546386 | A | 9/2009 | |
| CN | 102802529 | A | 11/2012 | |
| DE | 196 33 337 | A1 | 2/1998 | |
| EP | 0 042 179 | A2 | 12/1981 | |
| EP | 0042179 | A2 * | 12/1981 | ............ H03M 1/203 |
| EP | 1 043 571 | A1 | 10/2000 | |
| EP | 1043571 | A1 * | 10/2000 | ........... G01D 5/2497 |
| WO | 97/43730 | A1 | 11/1997 | |

OTHER PUBLICATIONS

Huang, Z., et al., "Error analysis of optical angular encoder and its calibration with ring laser gyro," Chinese Journal of Scientific Instrument , vol. 28, Issue 10, Oct. 31, 2007, pp. 1866-1869.

* cited by examiner

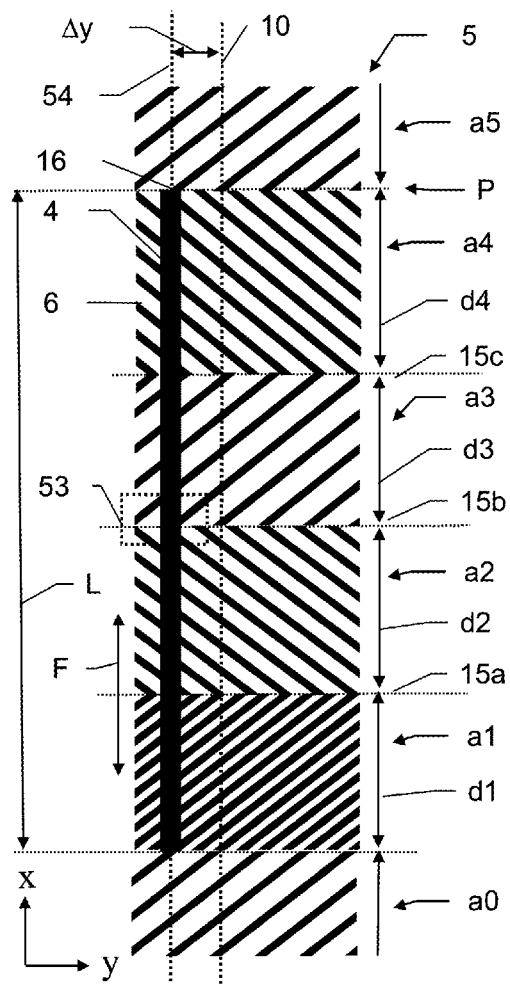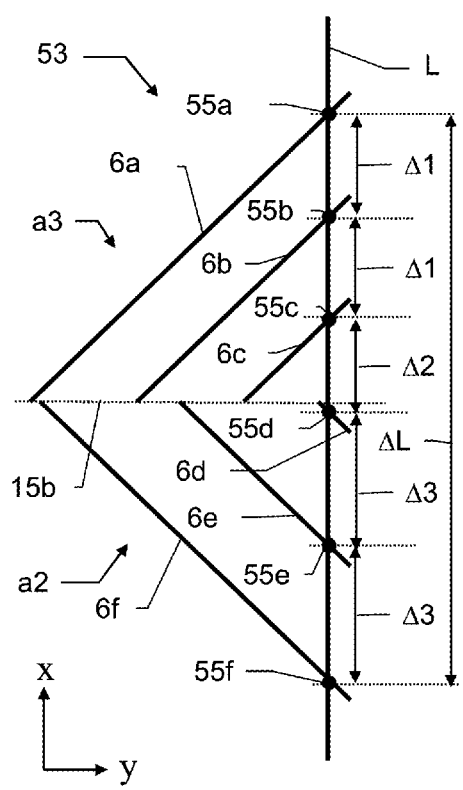
Fig 3a
Fig 3b

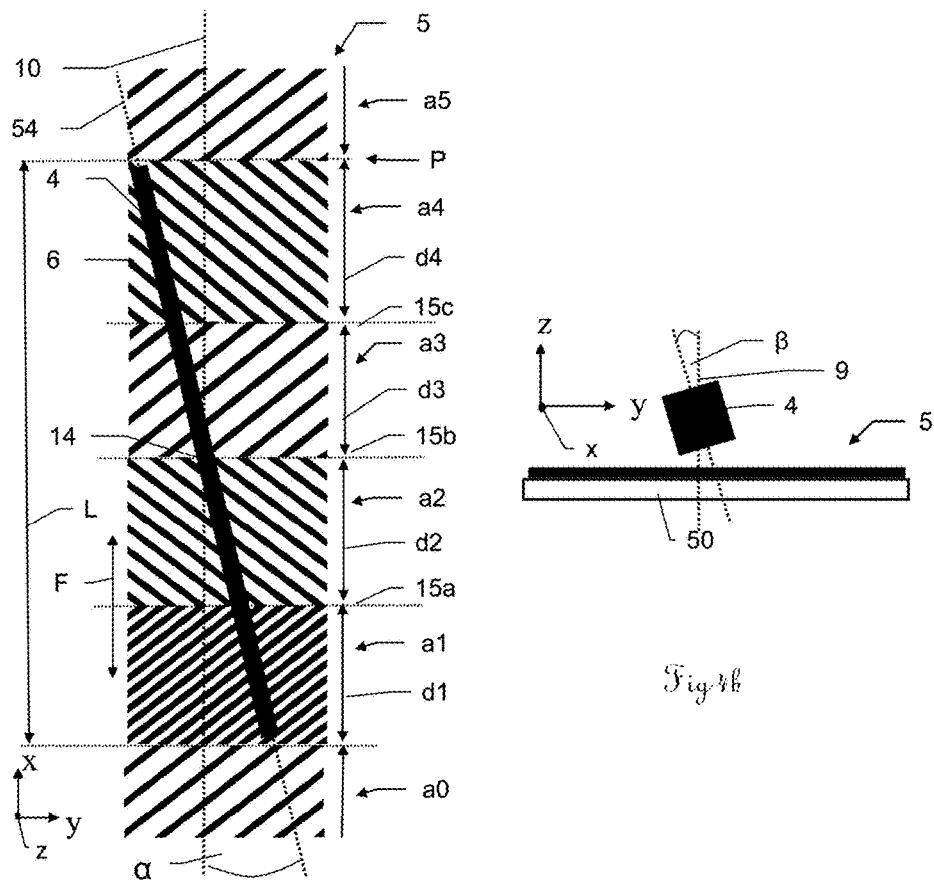
Fig 4a
Fig 4b
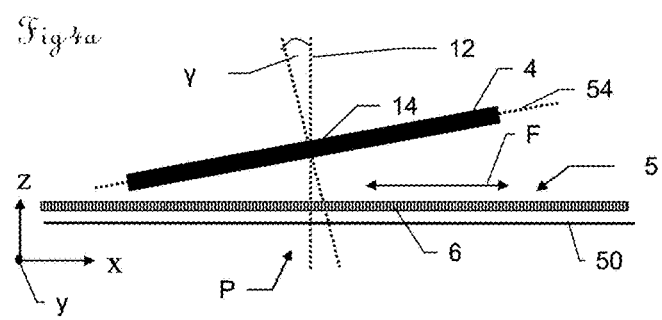
Fig 4c

SYSTEM FOR DETERMINING POSITIONS WITH A SENSOR USING A 2D-CODE PATTERN FOR DETERMINATION OF A DISCREPANCY FROM AN IDEAL SITUATION

FIELD OF THE INVENTION

Some embodiments of the invention relate to a system for determining positions along a direction of advance having a sensor for scanning a pattern and a scannable 2D and also to a method for determining positions along a direction of advance and just such a computer program product.

BACKGROUND

Systems for determining positions along a direction of advance are required in many fields of application in which the position of an object that is mobile along a direction of advance needs to be determined, e.g. the position of a machine component on a linear axle, such as drives or swivel arms. The positions sensed in this case can be used as position values for measurement purposes, or else for positioning components using a drive with a position control loop. Such position finding systems are accordingly found in devices such as coordinate measuring machines (CMM), geodetic devices, robot arms or hydraulic actuators. Such a system normally has a pattern and a sensor, with either the pattern or the sensor being connected to the mobile object and the pattern and the sensor being mobile relative to one another along the direction of advance. The sensor scans the pattern and produces a scan signal that is dependent on the scanned pattern section. The pattern is structured such that the scan signal changes upon a change in the relative position of the sensor in relation to the pattern and hence the position that is to be determined for the object. A control and evaluation unit of the system ascertains the sought position from the scan signal using stored information about the pattern. By way of example, the pattern for incremental position finding has pattern elements of the same type that are arranged at the same respective distance from one another in the direction of advance. The sensor scans one pattern element in each case. The information stored in the control and evaluation unit is the distance between the pattern elements, so that, on the basis of a defined zero position for the sensor and the pattern, it is possible to determine the position from the number of the scan signals of the same type that are scanned for a relative movement by the sensor and pattern. A disadvantage of systems with incremental position finding is that, when the system is restarted, it is necessary to start from a zero or reference position again each time.

By contrast, in the case of systems with absolute position finding, respective individual pattern elements or successions of pattern elements produce unique and distinguishable scan signals. This allows a unique position to be associated with a respective relative position for the sensor and the pattern immediately, i.e. without approaching a reference position.

Ideally, sensor and pattern change their relative position in relation to one another only in the direction of advance, i.e. their movement relative to one another has only one degree of freedom (DoF). In practice, however, undesirable deviations from this ideal situation frequently arise, i.e. the position of the sensor in relation to the pattern varies unintentionally often in at least one further spatial direction, i.e. in respect of at least one further degree of freedom of movement, e.g. in the form of an offset, a skew or a tilt. In this case, the offset is either constant or, on account of the direction of advance and the longitudinal axis of the pattern not being exactly parallel to one another, dependent on the relative position. In addition, skew or tilts in the sensor can arise, i.e. unintentional rotation of the sensor about at least one of its axes. Such discrepancies from the ideal situation can adversely affect measurement accuracy. Keeping such deviations as small as possible, i.e. observing the ideal position as accurately as possible, or compensating for deviations requires a high level of design complexity and/or complex calibration methods, particularly when there is a large region of movement in the direction of advance.

As an alternative, U.S. Pat. No. 6,333,511 discloses a system for determining positions of an object along a direction of advance, which is furthermore intended to be able to be used to identify a slight movement by the object or the sensor perpendicular to the direction of advance or is intended to allow flush orientation of the sensor with the direction of advance. The system is based on optoelectronic, incremental position finding and has an alternately opaque and transparent strip pattern along the direction of advance, which is scanned by a sensor having an array of detectors using trans-illumination methods. The, preferably uniform, distance of the strips in relation to one another is known and stored in a control and evaluation unit. The strip pattern and the sensor are attuned to one another such that, in each relative situation of the pattern in relation to the sensor, there is ever only no more than one edge of a strip, i.e. a boundary between an opaque strip and a transparent strip, scanned by a detector. Depending on the relative situation of an opaque strip in relation to the detector (and hence the pattern or the position of a mobile object connected to the pattern), the detector senses different amounts of light, so that the light-dependent intensity of a detector signal produced by a detector in each case is dependent on the relative position.

As a result, the sought position can be ascertained incrementally using the detector signal intensity of an individual, suitably selected detector. A suitable detector is one that scans an edge of a strip and, in so doing, neither senses the minimum possible light intensity (in the case of complete dimming as a result of an opaque strip) nor senses the maximum possible light intensity (in the case of complete illumination as a result of a transparent strip). To increase precision, the final position is computed by means of averaging from many position values ascertained by means of individual detectors. Determination of movements (see above) by the object or the sensor perpendicular to the direction of advance or a flush orientation of the sensor in the direction of advance is made possible according to U.S. Pat. No. 6,333,511 by the use of a pattern of v-shaped strips or an additional pattern with strips that are oriented parallel to the direction of advance. A disadvantage of the system according to U.S. Pat. No. 6,333,511 is that firstly absolute position finding is not possible, secondly it is not possible to determine further deviations from an ideal position for the sensor relative to the pattern other than a slight movement by the object or the sensor perpendicular to the direction of advance and a flush orientation of the sensor, and thirdly orientation of the detector array along the direction of advance, i.e. scanning in the direction of advance instead of orthogonally in relation thereto, is admittedly possible but is associated with losses of precision. Absolute position finding is possible in the case of the system disclosed in U.S. Pat. No. 6,333,511 only by using additional position finding means or an additional strip pattern that extends parallel to the first pattern in the direction of advance. The additional means or the additional strip pattern can be used to determine an absolute position, as a result of which the incremental position finding described can be located absolutely, i.e. only the incremental pattern and the additional position finding means or the additional pattern can be used to ultimately indicate an absolute position. A disadvantage in this case is that the absolute position can be determined only relatively coarsely.

EP 0042179 likewise discloses a system for determining positions along a direction of advance, which system allows determination of deviations from an ideal position using a pattern having v-shaped strips. In this case too, a position determined incrementally using a pattern is located absolutely by means of a further separate, absolute pattern extending parallel to the first pattern in the direction of advance, with the absolute pattern of EP 0042179 coding coarse positions using a Gray code.

SUMMARY

Some embodiments of the present invention to provide an improved system for determining positions along a direction of advance that can be used to determine both a deviation of a sensor from its ideal position in relation to a pattern and, simply but precisely, the absolute position.

The present invention relates to a system for determining positions along a direction of advance. The system has a first two-dimensional pattern (2D pattern) that extends in the direction of advance and a first sensor, integrated in a first scanning head, having an array of detectors for scanning the first 2D pattern and for producing a scan signal. In this case, the first 2D pattern is scanned by the first sensor using detectors in a stipulated elongate section of the array. The length of this section is defined as the scanning length. The orientation of the scanning length defines a longitudinal axis. The scanning length corresponds to no more than the extent of the detector array and is very much smaller than the extent of the first 2D pattern in the direction of advance. In addition, the system has a control and evaluation unit for evaluating the scan signal. The first sensor and the first 2D pattern are mobile relative to one another along the direction of advance. The first 2D pattern comprises pattern elements and is in a form such that the first 2D pattern can be used to determine the position that is to be determined absolutely and additionally to determine a discrepancy from an ideal situation in respect of at least one degree of freedom of movement (besides the movement in the direction of advance) for the first sensor relative to the first 2D pattern. To this end, the pattern elements each form a first code word at least on a portion of the scanning length. Code words are understood to mean successions of digital values that can be unequavocally distinguished from one another. In each case, the first code word codes the position that is to be determined absolutely, so that the first 2D pattern forms an absolute position code trace in the direction of advance from a series of first code words arranged in succession. In addition, the first code word associated with each position can be taken as a basis for determining the deviation from the ideal position for the first sensor relative to the first 2D pattern in the respective position. The scan signal produced by the first sensor in the respective position corresponds to the first code word. In the control and evaluation unit is stored a piece of decoding information, preferably a decoding table, that can be used to uniquely associate an absolute position with each scan signal. In addition, in the control and evaluation unit is stored information that can be used, on the basis of the first code word or the associated ideal scan signal, to evaluate the ascertained scan signal such that the deviation from the ideal position for the first sensor in relation to the first 2D pattern can be determined at least in respect of a degree of freedom of movement.

It is particularly advantageous in respect of the cost/benefit ratio to use a line sensor as the sensor, i.e. a sensor having a linear array of detectors that is elongated in one dimension. The illustrations that follow therefore relate to a line sensor by way of example, even though the present invention is not limited to such line sensors, but rather also covers other sensors, e.g. multiline sensors or sensors having a 2D array of detectors, with the features described above.

Preferably, the system is designed for opto-electronic and/or capacitive/electronic pattern recognition or scanning of the first 2D pattern, even though all physical operating principles that can be used in systems for determining positions are suitable according to the invention. In order to form first code words that code the sought positions absolutely at least on a portion of the scanning length, the pattern elements of the first 2D pattern are embodied and/or arranged so as to be distinguishable in a manner defined in the direction of advance, so that in each case a defined number of pattern elements that is attuned to the scanning length forms a succession of digital values that occurs only once on the whole 2D pattern in the direction of advance. As a result, each succession is unique and suitable for absolute position coding. Different embodiment means e.g. different form or distinguishable scannable physical property of the pattern elements, that is to say transparency or reflectivity in the case of an optical first 2D pattern, for example, and distinguishable arrangement means e.g. different sequence or inclination of the pattern elements. In each relative position of the first line sensor in relation to the first 2D pattern, each pattern element that is located, at least to some extent, in the region of the scanning length can be scanned by at least one detector. In this case, it is not necessary, as in the case of systems based on the prior art, for an edge of a pattern element to be able to be scanned by a detector. In this respect, in contrast to the prior art, it is not necessary to attune the width of the pattern elements and the detectors of the line sensor to one another. Preferably, however, at least one pattern element or a section of a pattern element can be scanned by each detector of the scanning length in each relative position of the first line sensor in relation to the first 2D pattern. The detectors on the scanning length form a succession of electrical signals by scanning the pattern elements coding a first code word, with a digital value being assigned to the signal from each detector that is produced by scanning. Hence, the scan signal corresponds to the scanned first code word in each case. Each code word has an associated position along the direction of advance. This association is stored as a decoding table in the control and evaluation unit, which is used to decode the scan signal and hence to ascertain the position. The-absolute position code trace that is formed by the first 2D pattern codes positions, for example in binary form, using a pseudo random code (PRC) or using maximum sequences (maximum length sequence MLS). Further examples of codes that are suitable for the present invention can also be found in the Swiss patent application CH 704584 dated 2 Mar. 2011 from the same applicant, for example, which are hereby part of this application. With reference to FIGS. 4 to 7, the patent application CH 704584 describes the provision of successions of pattern elements for representing codes. The length of the successions is optimally attuned to the application-specific optimum resolution and arbitrarily selectable. The aforementioned examples are nonetheless not intended to be understood as a restriction.

As a result of the embodiment or arrangement, according to the invention, of the pattern elements, a defined number of code words is thus available on the first 2D pattern. A series of absolute position values in coded form is thus present along the measurement path by means of the code words. As a result, the first 2D pattern can be used to determine a discrete number of positions on the measurement path absolutely (the positions possibly being refineable with further methods, see below). The step size, i.e. the distance between the absolutely determinable positions, can be set by the embodiment or arrangement of the pattern elements.

A deviation from an ideal position for the first line sensor relative to the first 2D pattern may be present in respect of one or both of the two translational directions of movement that remain besides the movement in the direction of advance and/or in respect of one or more of the three rotational axes of movement (all five generally denoted as degrees of freedom of movement). By way of example, there is a deviation from an ideal position in respect of a rotational degree of freedom when the first line sensor is skewed from an ideal orientation in relation to the first 2D pattern about an axis that is perpendicular on the plane in which the 2D pattern is situated. Other types of deviation from an ideal position are tilting about the longitudinal axis of the first line sensor or tilting of the longitudinal axis itself about an axis that is perpendicular thereto and parallel to the first 2D pattern, as a result of which the detectors along the linear array are at different distances from the first 2D pattern, a lateral offset in the first line sensor, i.e. a deviation in a direction of movement that is orthogonal in relation to the direction of advance and parallel to the 2D pattern plane, or a change in the distance of the first line sensor from the first 2D pattern, i.e. a deviation in a direction of movement that is orthogonal in relation to the direction of advance and the 2D pattern plane.

At least one of these types of deviations from an ideal position can be determined by the system according to the invention on the basis of the first code word. To this end, each first code word codes not only the absolute position in the direction of advance but also the deviation(s) in the respective position of the first line sensor relative to the first 2D pattern, i.e. normally the first 2D pattern has two or more first code words for the same absolute position in the direction of advance, which code words each code different deviations from an ideal position in respect of the same degree of freedom of movement or the same degrees of freedom of movement in addition to the absolute position. Alternatively, the first code words or the corresponding scan signals are stored in the control and evaluation unit as a function of the deviation from the respective ideal position in respect of one or more degrees of freedom of movement, i.e. use is made of the fact that the deviations of the line sensor from its ideal position result in a deviation in the scan signal from the ideal scan signal, which would have to be produced at the respective position by the associated first code word at this position in the line sensor. Alternatively or additionally, in embodiments in which the first code word is formed in each case only by a portion of the scanned pattern elements in a position, the deviation(s) is (are) ascertained from the situation of the pattern elements forming the first code word within the scanning length or the position of the detectors detecting these pattern elements within the linear array. Optionally, the signal intensity (intensities) of the first line sensor and/or its detectors relative to a signal intensity in the ideal position is (are) taken into account. In all alternative forms, pattern elements that are oriented within the pattern plane so as to be inclined in relation to the direction of advance are particularly suitable for the coding of absolute position and deviation.

In some embodiments, the first 2D pattern is in a form such that in each case a sequence of pattern elements forms a first code word in the direction of advance. In other words, the first code words have different and distinguishable embodiments and/or arrangements of the pattern elements in the direction of advance. Accordingly, the first line sensor—or, to be more precise, its longitudinal axis—is oriented approximately in the direction of advance, so that, in each relative position of the first line sensor in relation to the first 2D pattern, it is possible to scan pattern elements in each case that together form a code word. In the case of systems based on the prior art, there is a decrease in the precision of the position finding when the orientation of the scanning direction is changed from orthogonal in relation to the direction of advance to parallel to the direction of advance. By contrast, the present invention affords the advantage that the absolute coding according to the invention allows such a scanning direction parallel in relation to the direction of advance without the need to accept a decrease in the precision of the position finding. The use of just a single pattern or of just a single position code trace allows narrow position finding systems regardless of the scanning direction of the line sensor in respect of the 2D pattern, i.e. compact systems with a small extent transverse to the direction of advance. The parallel scanning direction described, i.e. scanning in the direction of advance, allows an even greater decrease in the pattern width and even more compact systems. Hence, such systems according to the invention afford advantages particularly when absolute positions and deviations from an ideal position need to be determined in the case of spatially limited measurement environments or in the case of narrow machine components.

Optionally, the first code words formed by a pattern element sequence in the direction of advance have, in the direction of advance, pattern elements in a different and distinguishable embodiment and/or arrangement such that the first 2D pattern is split, in the direction of advance, into a multiplicity of respectively adjoining regions having pattern elements in, in relation to one another, a different embodiment and/or arrangement. Each region having pattern elements in a defined embodiment and/or arrangement forms a region type. In said embodiments, the first 2D pattern thus has at least two, preferably a plurality of, particularly a multiplicity of, region types of different form, i.e. at least two regions having a different, inherently defined embodiment and/or arrangement of pattern elements on the whole first 2D pattern occur. In the case of a first 2D pattern having a number of types that is just two, these two types always occur alternately in the direction of advance, so that they are distinguishable. The regions each have a region length in the direction of advance. In this case, a region length is intended to be understood to mean the extent of the respective region in the direction of advance, that is to say its extent or length in respect of the direction of advance. In this case, the scanning length of the first line sensor is attuned to the region lengths such that the first line sensor can simultaneously scan pattern elements from at least two regions in each position. Hence, in each case it is possible to scan a sequence of distinguishable region types on a scanning length. These region sequences are used to form a respective first code word. Optionally, the regions have at least two distinguishable region lengths in the direction of advance, and the region lengths are likewise used to form a respective first code word. This is accomplished preferably by using the region sequences and region lengths that can be scanned on a scanning length in combination in a respective position for the purpose of forming code words. In this case, the number of different region types and the number of different region lengths are chosen in a manner attuned to one another, preferably by virtue of the numbers being coprime in relation to one another. Since first 2D patterns are formed from region types and optionally very differently chosen region lengths, comparatively simple and robust absolute codings are obtained, since even a scan signal that is plagued by uncertainties or errors can have at least region types or region lengths, but in most cases both, associated with it.

An increase in the robustness and/or accuracy in an advancement in systems in which a sequence of pattern elements forms a first code word in the direction of advance is achieved by virtue of the first scanning head having not only the first line sensor but also at least one second line sensor for scanning the first 2D pattern. The two line sensors are preferably oriented approximately parallel to one another and arranged either at a defined distance from one another in succession in the direction of advance or next to one another. The defined distance from a first to a second line sensor as the distance of the sensor centers in relation to one another is subsequently called the line sensor distance. If the two line sensors are oriented in succession in the direction of advance, the line sensor distance is more than the average of the two line sensor lengths, the two line sensors also being able to be produced by one long line sensor having two detector arrays that are isolated from one another and at a distance from one another. The line sensor distance is known and stored in the control and evaluation unit.

In another advancement of the system according to the invention, the first scanning head has a first line sensor, the longitudinal axis of which is oriented approximately orthogonally in relation to the direction of advance, and a second line sensor, the longitudinal axis of which is likewise oriented approximately orthogonally in relation to the direction of advance, the two line sensors being oriented approximately parallel to one another. The first and second line sensors are at a defined line sensor distance from one another and are preferably integrated in the first scanning head in succession in the direction of advance. In this embodiment, the first 2D pattern has pattern elements that form first code words orthogonally in relation to the direction of advance. The scan signal from the second line sensor corresponds to a first code word, as does that from the first line sensor, so that this can likewise be used to determine a position and a deviation from an ideal position situation for the second line sensor in relation to the first 2D pattern. The sought position in the direction of advance is then determined from the two redundantly determined positions of the first and second line sensors, e.g. by averaging, which allows increases in precision.

Optionally, in systems having two line sensors at a distance from one another, the respective deviations from an ideal position for the first and second line sensors are used in light of the line sensor distance to determine deviations from an ideal position at least in respect of a degree of freedom of movement of the first scanning head, which, as a result of the use of two line sensors at a distance from one another, is possible with even greater precision than with just one line sensor. In embodiments with particularly high demands on position finding, deviations from an ideal position for the scanning head are determined for all degrees of freedom of movement, that is to say for the two remaining degrees of freedom for translation and the three for rotation.

As a further option, the scanning by the two line sensors is additionally or alternatively used to determine deformations in the scanning head that e.g. are heat-related or age-related. For the greatest possible precision, particularly in reference to skews in the scanning head about an axis that is orthogonal in relation to the direction of advance, the line sensor distance is chosen to be as great as possible in this case, and ideally the two line sensors are mounted at two opposite ends of the first scanning head. As an alternative to the use of two line sensors having a linear array of detectors, an area sensor is used in which only the two outermost linear arrays are used or read for scanning. It goes without saying that it is possible to use an area sensor instead of a line sensor even in the case of a first scanning head having just one linear array of detectors. The advantage according to the invention, that a single detector line can be read much more quickly than a plurality of lines, is retained thereby, but line sensors are advantageously cheaper than comparable area sensors.

Further increases in precision are optionally made in all systems according to the invention using methods known from the prior art in which the positions determined or determinable using the first code words can be refined. In the case of optoelectronic systems, such methods for subcode-accurate position finding are e.g. the determination of the focus(es) of brightness distributions within the linear array or an evaluation of the signal intensity of some or all detectors in comparison with a reference intensity. The methods are applied as a further option in a similar manner when determining the deviation from an ideal position.

The present invention furthermore relates to a measuring apparatus having limbs that are movable in relation to one another in a direction of advance. In order to determine the position of the movable limbs relative to one another along a measurement path, the measuring apparatus according to the invention has a first system according to the invention for determining positions along a direction of advance. Preferably, the measuring apparatus is in the form of a linear encoder, and in this case the first 2D pattern is part of a material measure.

The measuring apparatus optionally has at least one second system according to the invention having a second 2D pattern having second code words and a second scanning head for scanning the second 2D pattern. The second 2D pattern of the second system extends in the direction of advance parallel to the first 2D pattern of the first system. Each system comprising 2D pattern and associated scanning head is independently suitable for determining an absolute position along the direction of advance and deviations of the respective line sensor or scanning head from an ideal position in relation to the respective 2D pattern. The systems may be embodied identically in relation to one another. The first scanning head and the second scanning head are movable together, to which end the two scanning heads are preferably integrated in one object, for example a common bracket or a machine component, the position of which can be determined on a linear axis, such as drives or swivel arms, which object is movable, relative to the first and second 2D patterns, in the direction of advance.

Optionally, the first 2D pattern and the second 2D pattern, which is parallel thereto, are arranged in different planes. The angle enclosed by the two pattern planes together is known and stored in the control and evaluation unit and is specifically at least approximately a right angle, that is to say e.g. 90°±1° or 90°±3°. From the deviations from an ideal position for the first line sensor or the first scanning head and the second line sensor or the second scanning head, this three-dimensional arrangement of the two 2D patterns or of the first and second systems ascertains, in light of the angle between these two 2D pattern planes, deviations from an ideal position for the object in which the two scanning heads are integrated in respect of a plurality of, preferably all, degrees of freedom of movement. Hence, such a measuring apparatus according to the invention can determine not only the absolute position of an object that is movable along a direction of advance but also tilts, skews, etc., in the object or deviations of the object from an ideal orientation in space, that is to say three-dimensionally.

If there is a need for position finding on comparatively long measurement paths, i.e. a measuring apparatus with a long travel, then this requires correspondingly long 2D patterns. As a consequence, comparatively complex absolute codings and control and evaluation units are necessary, with disadvantages in respect of evaluation speed and manufacturing costs. Another disadvantage is high demands for manufacture and assembly of such a long 2D pattern. Such disadvantages are avoided by the subsequent advancement of measuring apparatuses according to the invention having a first and a second system with parallel first and second 2D patterns. In this embodiment, the measuring apparatus has a first system having a plurality of identical first 2D patterns that are assembled in succession in the direction of advance and together cover the whole measurement path. Each of the first 2D patterns continues, according to the invention, to independently allow the determination of an absolute position and a deviation from an ideal position over the whole length of the respective pattern. Since the first 2D patterns are identical to one another, however, there are a plurality of identical first code words along the whole measurement path, which means that positions along the whole measurement path—subsequently called measurement path position—cannot be unequivocally determined solely on the basis of the scanning of a first code word owing to these ambiguities. These ambiguities are now removed by means of at least one second system according to the invention having a second scanning head with a line sensor for scanning a plurality of identical second 2D patterns with second code words that are assembled in succession in the direction of advance and parallel to the first 2D patterns. The first 2D patterns of the first system and the second 2D patterns of the second system are set up in a manner attuned to one another such that each code word combination of a first code word and a second code word occurs only a single time along the whole measurement path in each relative position of the movable object in relation to the 2D patterns. Hence, each code word combination of the first code word and the second code word is unique. The control and evaluation units or a common control and evaluation unit for both systems store(s) information that can be used to absolutely associate an absolute measurement path position with each of these unique code word combinations. Preferably, the number of the first code words on the first 2D pattern and the number of the second code words on the second 2D pattern are of as similar magnitude as possible and coprime in relation to one another.

The measuring apparatus for determining positions along a direction of advance is in the form of a 3D coordinate measuring machine (CMM) in some embodiments. All three measurement or coordinate axes of the CMM each have at least one system according to the invention installed on them, so that the position and deviation determination according to the invention allows the position of a scanning tip of the CMM to be determined three-dimensionally in an absolute and precise manner.

The determination of a deviation from an ideal position for a line sensor or movable object or scanning head relative to a 2D pattern or a measurement axis and hence the possibility of taking this deviation into account when determining the position or of correcting the position in accordance with the determined discrepancy thus allow the system according to the invention or the measuring apparatus according to the invention to determine positions absolutely and precisely given simultaneously comparatively high tolerances for production, assembly and aging resistance of the materials used. This relates to the apparatus itself and/or to machine parts that bear the apparatus, such as guide components for displacing the scanning head in the direction of advance or pattern supports on which the 2D pattern is set. This is particularly advantageous in the case of a CMM in which displacements in three spatial directions interact, since the deviation determinations allow systems according to the invention to be used to determine correction values for the absolute 3D position of the scanning head, meaning that the otherwise high design demands and/or complex calibration methods can be dispensed with or, given the same design demands or the same calibration complexity, more precise position determinations are possible.

Hence, the present invention results in precision increases and/or cost advantages for the manufacture, assembly and/or maintenance of position finding systems or measuring apparatuses. Cost advantages are also obtained because absolute position finding requires no additional position finding means or multiple code traces, but rather positions can be determined absolutely using just a single code trace or a single 2D pattern. In embodiments according to the invention with orientation of the line sensor in the direction of advance, this single position code trace can be implemented in particularly narrow fashion and hence inexpensively without having to accept losses of precision. In addition, the present invention is advantageously suitable for different types of scales, e.g. even for angle scales or spherical scales.

The present invention furthermore relates to a method for determining positions along a direction of advance using a system according to the invention. The method according to the invention involves pattern elements of the first 2D pattern being scanned by the first line sensor on a scanning length. In addition, a scan signal is produced that corresponds to the first code word formed by scanned pattern elements. An absolute position is associated with the scan signal on the basis of decoding information stored in the control and evaluation unit, and the first code word and information stored in the control and evaluation unit are taken as a basis for determining a deviation from an ideal position for the first line sensor in relation to the first 2D pattern on the basis of the scan signal.

As part of the method for determining positions along a direction of advance, the deviation from an ideal position is optionally determined by solving a mathematical system of linear congruencies that is produced on the basis of the first code word by evaluating the scan signal and describes the scan signal as a whole or sections thereof. The solution is provided preferably by using the Chinese remainder theorem, or alternatively other mathematical methods suitable for solving linear congruencies are used.

For a measuring apparatus according to the invention as described above that has a first scanning head for scanning a first 2D pattern having first code words and at least one second scanning head for scanning at least one second 2D pattern, which is parallel to the first 2D pattern in the direction of advance, having second code words, wherein the first and second scanning heads are movable together in the direction of advance, the method according to the invention is further developed as follows. The first and second 2D patterns are in a form and arranged such that any combination of a first and a second code word is unique. The two 2D patterns are scanned in one step, i.e. the scanning takes place when the relative situation of the two scanning heads in relation to the 2D patterns is constant. The first code word formed by the scanned pattern elements of the first 2D pattern is combined with the second code word, which is formed by the scanned pattern elements of the second 2D pattern, to form a code word combination. A code word combination of this kind is, of course, also understood to mean the corresponding combination of the corresponding scan signals or of the associated absolute positions. This code word combination is taken as a basis for unequivocally determining a measurement path position. As part of the method, the scan signals are optionally taken as a basis for producing a mathematical system of linear congruencies and solving said mathematical system by using the Chinese remainder theorem or another suitable mathematical method.

In the case of a measuring apparatus according to the invention that is in the form of a CMM, the method is optionally further developed as follows. The CMM shall be used to determine a 3D coordinate, e.g. through mechanical or optical scanning with a scanning head. The 3D position of the scanning tip, that is to say the position thereof in space, and hence the sought 3D coordinate, is computed from the absolute positions determined for each coordinate axis with a respective system according to the invention and from the deviations from the ideal position of the respective line sensors or of the respective scanning heads. By way of example, the absolutely determined 1D position, that is to say the position in respect of one spatial direction, is corrected, separately for each measurement axis, with the determined deviations of the scanning head(s) of the respective position finding system of this measurement axis, and then the 3D position is computed from the 1D positions corrected in this manner. Alternatively, all deviations determined for a respective spatial direction, specifically deviations ascertained with respect to all measurement axes of the CMM, are used in order to correct the position for this respective spatial direction on a measurement axis of the CMM.

The present invention furthermore comprises a computer program product or computer data signal, embodied by an electromagnetic wave, with program code, for controlling or performing the method described above for the high-precision determination of positions or relative positions. The method can be controlled and executed by the system itself or using suitable data transmission apparatuses wholly or to some extent externally, e.g. by a connected computer unit.

The system according to the invention, the measuring apparatus according to the invention and the method according to the invention for the high-precision determination of positions along a direction of advance are described in more detail below, purely by way of example, on the basis of exemplary embodiments that are illustrated schematically in the drawings. Like elements are denoted by like reference symbols in the figures. The embodiments described are typically not shown to scale, and they are also not intended to be understood as a restriction.

BRIEF DESCRIPTION OF THE DRAWINGS

Specifically,

FIG. 3a, b show schematic illustrations of subregions of a system according to the invention with deviations from an ideal position in plan view;

FIG. 4a-c show schematic illustrations of subregions of a system according to the invention with further deviations from an ideal position;

DETAILED DESCRIPTION

Figure 1:
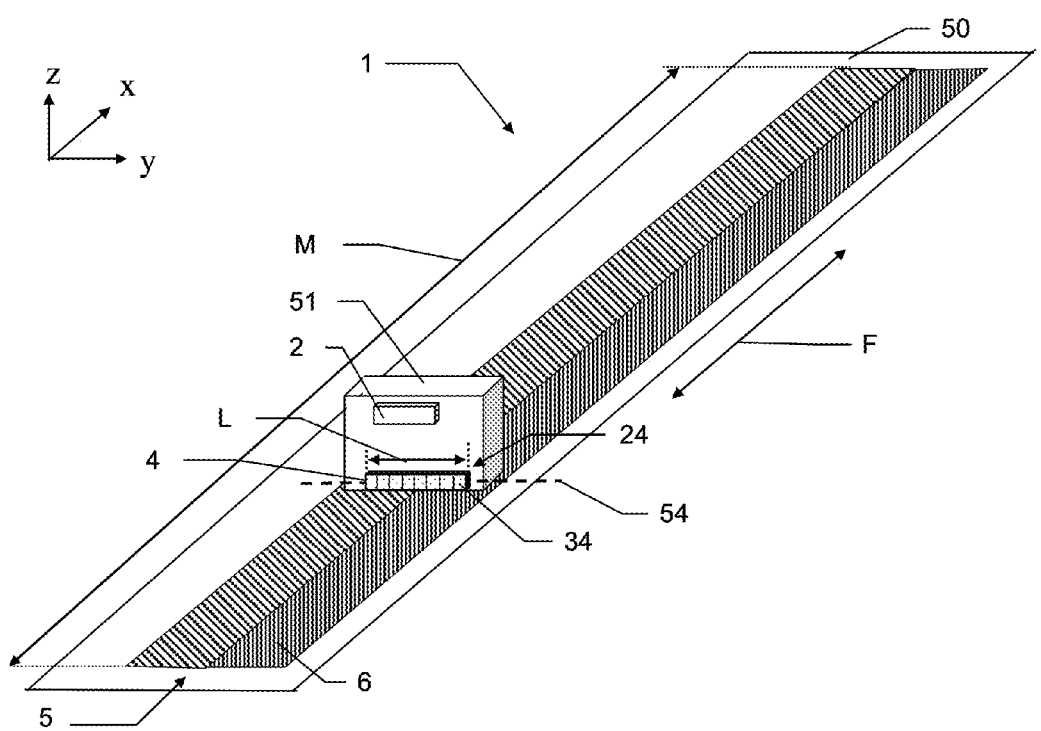
FIG. 1 shows a perspective view of a schematic overview of a system according to the invention for determining positions along a direction of advance.

FIG. 1 shows a schematic overview of a system 1 according to the invention for determining positions along a direction of advance F in a perspective view. In addition, the three spatial axes x, y and z are shown. The direction of advance F corresponds to the x direction. The system 1 has a first two-dimensional pattern (abbreviation: 2D pattern) 5 comprising pattern elements 6 that is set on a pattern support 50. The system 1 is positioned such that the first 2D pattern 5 is situated in the xy plane and the longitudinal axis of the first 2D pattern 5 is the same as the x axis, so that the first 2D pattern extends in the direction of advance F. The system 1 additionally has a first scanning head 51 having a control and evaluation unit 2 and having a first sensor 4 for scanning the first 2D pattern 5, wherein the sensor 4 has a scanning length L that is known and stored in the control and evaluation unit 2. The scanning length L of the sensor 4 defines a longitudinal axis 54 of the sensor 4.

The first sensor 4 has an array 24 having detectors 34, at least some of which are arranged in the direction of the longitudinal axis 54 and the scanning length L. The placement of the detectors 34 in the array 24 is known and stored in the control and evaluation unit 2. In the examples, the first sensor 4 (and accordingly the second sensor, described later on) is in the form of a line sensor, which thus means that the array 24 is linear, that is to say has a linear arrangement of detectors 34. Alternatively, e.g. for the purpose of a further increase in precision, other kinds of sensors such as area or multiline sensors are used. The scanning length L corresponds to no more than the length of the linear array 24. In the example, the longitudinal axis 54 of the first line sensor 4 is situated in a plane parallel to the xy plane and extends in the y direction, so that the linear array 24 is oriented approximately perpendicularly in respect of the direction of advance F. Alternatively, the longitudinal axis 54 of the first line sensor 4 is arranged in the x direction such that the linear array 24 is at least approximately oriented in the direction of advance F. The first scanning head 51 and hence the first line sensor 4 integrated in the first scanning head 51 are mobile relative to the pattern support 50 and hence to the first 2D pattern 5 in the direction of advance F. The maximum range of movement that is possible for this relative movement defines a measurement path M on which positions can be determined. To determine a position of the scanning head 51 on the measurement path M, the first line sensor 4 scans the first 2D pattern 5 in the position provided. This results in a scan signal that is evaluated by the control and evaluation unit 2. Alternatively, it is conceivable for the scan signal to be transmitted from a communication unit of the system to an external computer that performs the evaluation of the scan signal instead of the control and evaluation unit 2 and optionally returns said evaluation to the system 1. In this case, a position is understood to mean the respectively current whereabouts of the first scanning head 51 on the measurement path M during the scanning of the pattern. All physical operating principles, such as inductive, capacitive, magnetic or optical measurement principles, that involve electrically, magnetically or optically scannable pattern elements 6 being scanned by a first line sensor 4 in appropriate form are suitable for pattern recognition. For an optical measurement principle, a first 2D pattern 5 having reflective and non-reflective or transparent and opaque pattern elements 6 is illuminated or trans-illuminated, for example, and the reflected or transmitted light is sensed by a photosensitive CCD or CMOS linear array. For a capacitive measurement principle, a first 2D pattern 5 having electrodes as pattern elements 6 is used, which, with electrodes of a corresponding first line sensor 4, form a capacitance that varies with the relative movement.

The system 1 is in a form such that the first 2D pattern 5 can be used to determine the position in the direction of advance F absolutely, to which end the pattern elements 6 form unique code words that code the positions absolutely. Furthermore, the first 2D pattern 5 can be used to determine a deviation from an ideal position for the line sensor 4 (and hence for the first scanning head 51) relative to the first 2D pattern 5. This is described in more detail with reference to the further figures.

Figure 2A:
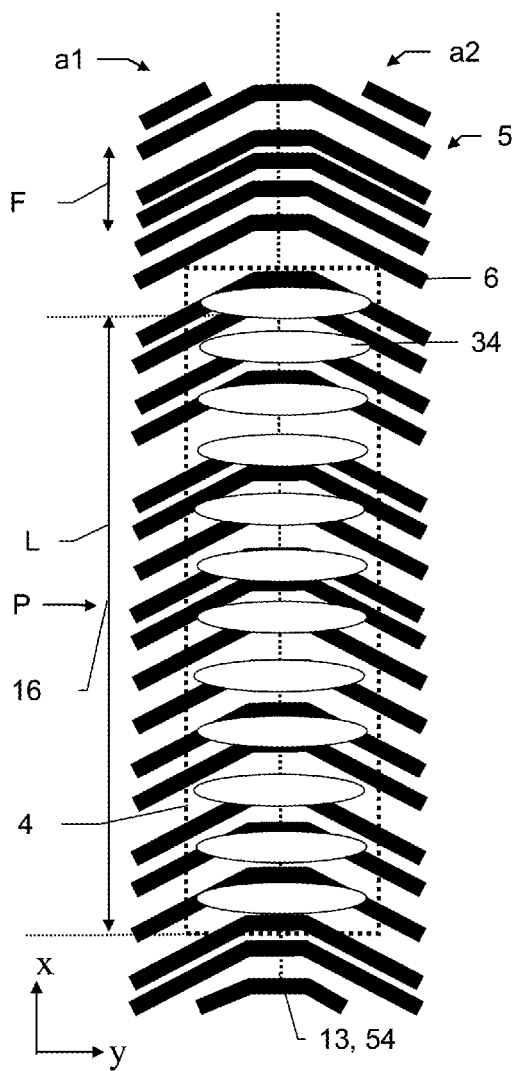
FIG. 2a-c show schematic illustrations of subregions of embodiments of a system according to the invention with a 2D pattern and a line sensor in plan view.

FIG. 2*a* purely schematically shows a sub-region of a system 1 according to the invention for determining positions along a direction of advance F. It uses a plan view, i.e. along the x axis, to show a detail from a first 2D pattern 5 according to the invention comprising pattern elements 6 and, schematically (indicated by a rectangle formed by a dotted line), a first line sensor 4 for scanning the first 2D pattern 5. The first 2D pattern 5 and the first line sensor 4 are located, with reference to the direction of advance F, along the measurement path M in a position P relative to one another.

The longitudinal axis 54 of the first line sensor 4 is oriented in a direction of advance F and in a plane parallel to the pattern plane x-y, and ideally the longitudinal axis 54 therefore runs exactly in the x direction, with production tolerances and other deviations therefrom that arise e.g. during use also being covered by the terms "parallel" and "oriented in the x direction". Accordingly, the first 2D pattern 5 may be in very narrow (width in the y direction) form, comparatively narrower than systems based on the prior art. Such a slight extent of the 2D pattern 5 or of the first line sensor 4 and hence of the system 1 transversely with respect to the direction of advance F affords advantages in narrow measurement environments or in respect of a compact system design. Since the first line sensor 4 has an extent in the x direction as a result of the present orientation, an arbitrarily selectable reference point 16 on the scanning length L needs to be defined that is used as a reference for the determination of the position P of the scanning head in the direction of advance F. In the example, the center of the scanning length L is defined as the reference point 16.

The pattern elements 6 are in a form and arranged such that they each form a unique first code word, that is to say a unique succession of digital values, on a scanning length L. To this end, the first 2D pattern 5 has patent elements 6 of the same type that are arranged differently as defined by a stipulated regularly varying or pseudo random sequence. Alternatively or additionally, the pattern elements 6 code by virtue of an embodiment that is distinguishable in a defined manner, for example in respect of their form (e.g. width, length in the x-y plane) and/or their properties that have a physical effect during scanning (e.g. in the case of an optical operating principle their transparency or their reflectivity). In the example, pattern elements 6 of the same design are arranged so as to vary in a defined manner in respect of the direction of advance F, so that unique first code words are formed that code the positions. In this case, the first 2D pattern 5 has two regions a1 and a2 that are symmetrical with respect to one another and have an axis of symmetry 13 that runs in the direction of advance F.

Each first code word appears only a single time on the measurement path M or the pattern support 50 along the direction of advance F. Thus, by virtue of the embodiment and/or arrangement of the pattern elements 6, the first 2D pattern 5 forms an absolute position code trace with reference to the direction of advance F, for example from a pseudo random code (PRC) or in accordance with a maximum sequence (maximum length sequence MLS) in the case of binary or more significant coding. Hence, the present system is a single-trace absolute encoder, i.e. the positions can be determined absolutely using just a single position code trace. In this case, the resolution of the position finding, i.e. the number of the determinable positions on the measurement path, can be set by the number of the first code words in a direction of advance on the measurement path M, which in turn can be set by the embodiment and/or arrangement of the pattern elements 6 in coordination with the first line sensor 4 used.

The first line sensor 4 scans the first 2D pattern 5 using its detectors 34 arranged within the scanning length L, wherein it produces a scan signal in the form of a succession of digital values, which scan signal corresponds to the first code word formed by the scanned pattern elements 6. The system 1 uses the capacitive operating principle in the example, to which end the pattern elements 6—which are shown purely schematically—and the detectors 34 of the first line sensor 4 are in the form of electrodes. The pattern electrodes 6 and sensor electrodes 34 are capacitively coupled to one another. The capacitive coupling is dependent on the relative position of the first line sensor 4 in relation to the first 2D pattern 5, so that in the respective relative position a unique first code word is formed on a scanning length L by the respective pattern electrodes 6 capacitively coupled to the detector electrodes 34. In the case of an optical measurement principle, the pattern elements 6 preferably form a light/dark sequence, which is dependent on the position along the measurement path, for the signals that are to be sensed on a scanning length L. This light/dark sequence forms a first code word that in each case uniquely and absolutely codes a position to be determined.

The scan signal from the first line sensor 4 is output as a digital value that reproduces the scanned coding property of the pattern elements 6 as a succession of digital values (in the case of an optical operating principle e.g. by virtue of 1=light being assigned from a certain threshold value upward, and accordingly 0=dark below this threshold value). The scan signal from the first line sensor 4 is decoded by the control and evaluation unit 2, and the sought position P is determined absolutely therefrom, to which end a decoding table stored in the control and evaluation unit 2, which table can be used to associate an absolute position P with each scan signal. In other words, from a finite set of absolute, discrete positions P that is stored in the control and evaluation unit 2, the one that is associated with the succession of digital values that is embodied by the scan signal is selected, this association being unique. The association is preferably produced by a calibration pass and involves absolute positions being associated with the scan signals that correspond to the first code words on the basis of a standard measure.

The first 2D pattern 5 is in a form such that a scan signal corresponding to a first code word can be produced, and hence the sought position P along the measurement path M can thus be determined, even when there is a deviation of the scanning head from its ideal position. In addition, the 2D pattern can be used to determine the deviation from the ideal position itself. The first line sensor 4 and the 2D pattern 5 are in an ideal position in relation to one another when there is no lateral offset $\Delta y$—that is to say that, in the example shown, the longitudinal axis 54 of the line sensor 4 matches the axis of symmetry 13 of the pattern 5, or in other words there is no displacement in the y direction, when additionally there is no skew about the z axis (that is to say that the longitudinal axis 54 of the line sensor 4 is parallel to the x axis—counter example, cf. FIG. 4a), there is no tilt about the y axis (that is to say that the first line sensor 4 is not rotated about the y axis from the 0° position—counter example, cf. FIG. 4c) and there is no tilt about the x axis (that is to say that the first line sensor 4 is not rotated about the x axis from the 0° position—counter example, cf. FIG. 4b). In other words, the first line sensor 4 and the 2D pattern 5 remain in an ideal position in relation to one another when the first line sensor 4 and the first 2D pattern 5 are arranged in a well-defined and known initial position and initial orientation in relation to one another and, apart from the desired translation in the direction of advance F, no other movement occurs or has occurred. In order to determine a deviation from the ideal position of the first line sensor 4 in relation to the first 2D pattern 5, the pattern elements 6 shown in FIG. 2a have sections that are arranged in the pattern plane x-y with an inclination in relation to the direction of advance F. The determination, according to the invention, of a position P and of one or more of the cited deviations from the ideal position is described in more detail with reference to the figures that follow.

Figure 2B:
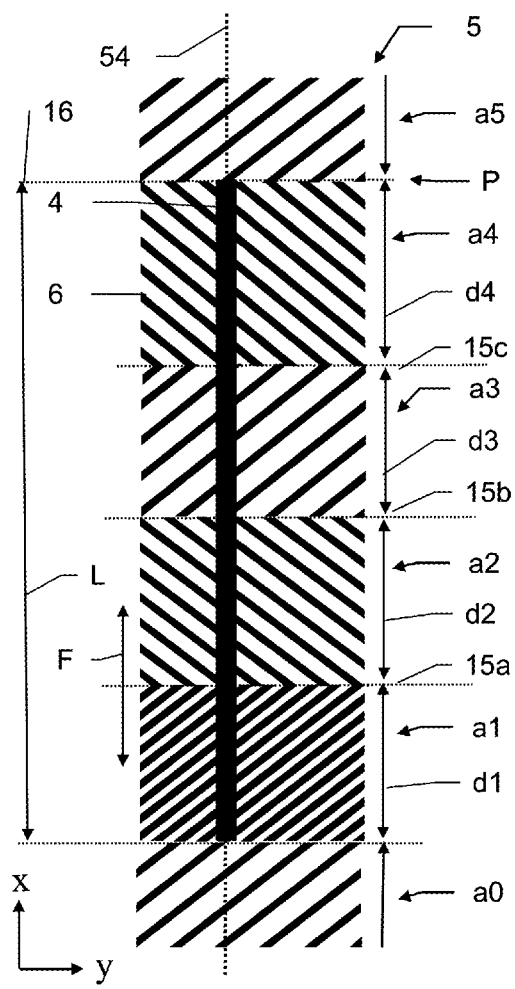

FIG. 2b shows a sub-region of a further embodiment of the system 1 according to the invention. It schematically shows the first line sensor 4 and a detail from a first 2D pattern 5 in plan view. The line sensor 4, as in the embodiment shown in FIG. 2a, has its longitudinal axis 54 oriented approximately along the direction of advance F. In the example, the reference point 16 on the first line sensor 4 for determining the position of the scanning head is defined as the end or the beginning of the scanning length L.

According to the invention, the pattern elements 6 are in a different arrangement such that they form a unique code word on a scanning length L and the first 2D pattern 5 is broken down in the direction of advance F into a multiplicity of regions a1, a2, a3, a4, . . . , ai with a different arrangement of the pattern elements 6. In this case, the different arrangement of the pattern elements 6 is brought about by variation of the orientation (inclination in relation to the x direction) of the pattern elements 6, or of the pattern element periodicity, i.e. number of the scannable property changes (e.g. in the case of the optical operating principle, opaque/transparent) on a measurement path portion. On the basis of the different arrangement of the pattern elements 6, the first 2D pattern thus has a multiplicity of adjoining different regions a1-ai. Alternatively or additionally, such regions a1-ai can be produced as a result of contrastingly different arrangement and/or different embodiment of the pattern elements 6. Regions having a different arrangement and/or a different embodiment of the pattern elements 6 form different region types, so that the first 2D pattern has a defined number of region types that differ from one another. Regions a1-ai in the same form are referred to as being of the same region type and can also occur repeatedly on the first 2D pattern 5. In the present simple example, the pattern has three region types, with e.g. a0, a3 and also a5 (type 1), a1 (type 2) and a2 and also a4 (type 3) being shown in the regions.

According to the arrangement of the pattern elements 6, the region boundaries 15a-15i run in the y direction, i.e. ideally orthogonally in relation to the direction of advance F. The distance between the region boundaries 15a-15i is referred to as the region length d1-di. The scanning length L and the region lengths d1-di are chosen in a manner attuned to one another such that at least one, in the example at least three, region boundary (boundaries) 15a-15i is (are) situated within the scanning length L in each relative position of the first line sensor 4 in relation to the first 2D pattern 5. Such a form of the first 2D pattern allows first code words to be able to be formed relatively simply using the resultant regions a1-ai, specifically by virtue of first code words being formed from respectively unique sequences of region types for each position along the measurement path M.

The region lengths d1-di, defined as the distance of two region boundaries 15a-15i in relation to one another in the direction of advance F, are, as shown in FIG. 2b, optionally different, even for like region types. The different region lengths d1-di are then used to form first code words by forming the first code words from a unique combination of region lengths d1-di and sequence of region types, as illustrated below using the example: In the example shown, the first 2D pattern 5 is constructed from three region types having four different region lengths d1-d4. In this case, the number of the different region lengths d1-di (in this case: four) and the number of the region types (in this case: three) are chosen in a manner attuned to one another, preferably so as to be coprime (relatively prime) in relation to one another, in order to obtain the greatest possible number of unique combinations and hence unique first code words. The result is $3^3=27$ different combinations of three successive region types. In addition, $4^2=16$ different combinations of two successive region lengths d1-di occur. Hence, in total $3^3 \cdot 4^2=432$ different code words can be formed from all the possible different arrangement combinations of the regions a1-ai in the direction of advance F. In the decoding table of the control and evaluation unit 2 are stored the sequences of the region types and region lengths d1-di or the different combinations thereof, so that the scan signals corresponding to a respective first code word can each have a position P associated with them. With 432 different first code words, it is possible, given an appropriately attuned scanning length L, for 432 different positions to be coded absolutely. Hence, given an (average) region length d1-d4 of e.g. 2 mm, it is possible for relative positions of the first line sensor 4 in relation to the first 2D pattern 5 along a measurement path of 86.4 cm in the direction of advance F to be determined absolutely. The maximum number of the code words that can be formed can be set by the choice of the scanning length L or, conversely, of the (average) region length di, the number of the region types and the number of the region lengths di. Longer measurement paths can be implemented e.g. by a first 2D pattern 5 having more than three region types ai and/or more than four region lengths d1-d4 and an appropriately adjusted scanning length L.

The first code words thus formed by the pattern elements 6 are firstly scannable comparatively robustly, or able to be converted into the corresponding scan signals by the sum total of the detectors without error, because the region types can be ascertained on the basis of the properties of the pattern elements that form them, such as the pattern element periodicities and/or pattern element inclinations, redundantly using a plurality of pattern elements (or sections of the digital succession formed by these pattern elements). Secondly, the region lengths d1-di can be chosen to have differences in relation to one another of such magnitude that the tolerances for the ascertainment of the region lengths d1-di on the basis of the scan signal are large. This is achieved by virtue of a plurality of slightly different successions of digital values or sections of these successions being in each case uniquely associated with a region length di (or, in combination with a region sequence, being uniquely associated with an absolute position) in the decoding table of the control and evaluation unit. That is to say that at least two very similar bit patterns that differ e.g. in two or three successive bits yield one and the same region length di when decoded. If e.g. two bit patterns differ only in one place, so that, by way of example, a zero appears instead of a one in one bit pattern, then both bit patterns have the same region length di associated with them. Hence, the region length di can be ascertained even in the event of reading inaccuracies or relatively small reading errors, which achieves a relatively robustly decodable absolute coding.

Figure 2C:
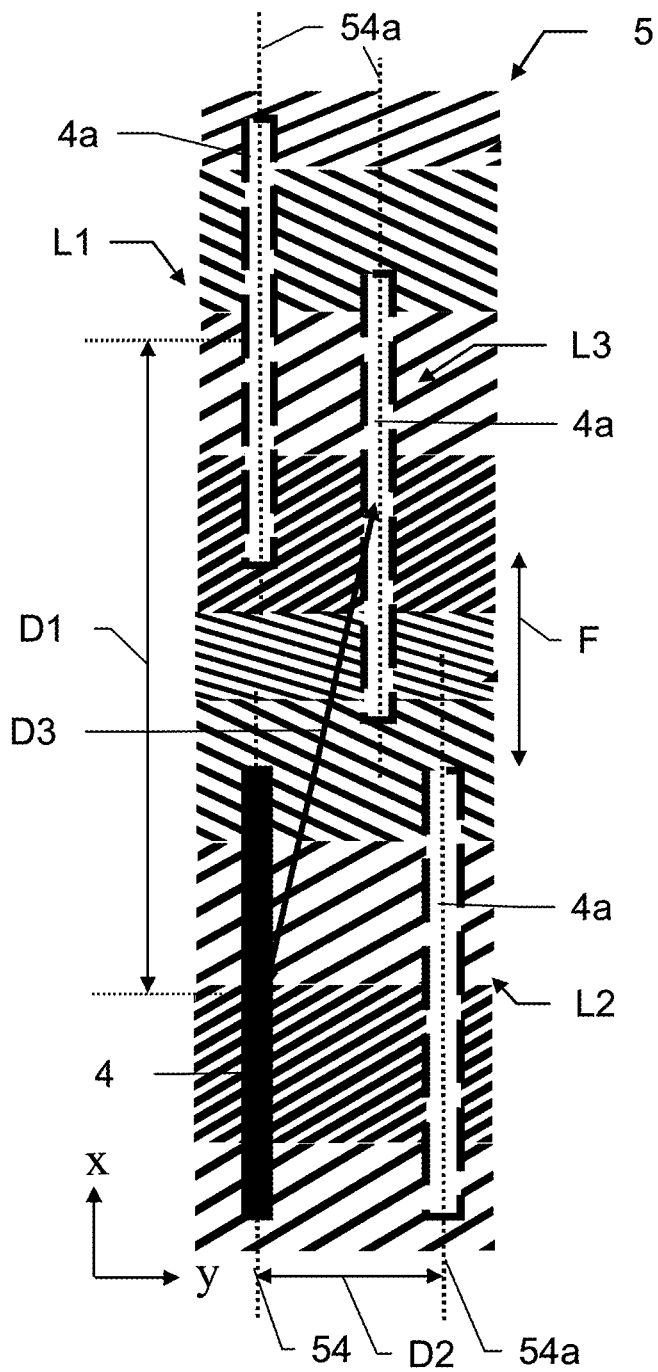

FIG. 2c schematically shows advancements for a system according to the invention in which the first scanning head 51 has, in addition to the first line sensor 4, a second line sensor 4a (shown in dashes in three different positions L1, L2 and L3 relative to the first line sensor 4) that is likewise oriented approximately in the direction of advance F in the plane parallel to the pattern plane x-y, so that the longitudinal axes 54 and 54a of the two line sensors 4 and 4a are arranged approximately parallel to one another. The two line sensors 4 and 4a are, in terms of the direction of advance F, either mounted in succession in the direction of advance (L1) in the scanning head, so that the two line sensors 4 and 4a are at a fixed line sensor distance D1 in the direction of advance F as the distance of the two line sensor centers 14 and 14' in relation to one another, which is known and stored in the control and evaluation unit. Alternatively, the two line sensors 4 and 4a are at a fixed line sensor distance D2 in the y direction, that is to say are arranged in succession in the direction of advance F (L2), or they are arranged with a parallel offset in relation to one another (L3) at a fixed line sensor distance D3. The second line sensor 4a corresponds to the first line sensor 4 in terms of its operation and may be of the same design as the latter, that is to say, like the latter, is designed to scan the first 2D pattern 5 and to produce a scan signal that corresponds to the first code word formed by the pattern element 6 scanned by the second line sensor 4a in each case, the scan signal being able to be used to determine the position coded by the scanned first code word and a deviation of the second line sensor 4a from its ideal position in relation to the first 2D pattern 5.

FIG. 3a shows the same embodiment of a system according to the invention as FIG. 2b. In the example shown in FIG. 3a, however, the position of the first line sensor 4 and the first 2D pattern 5 differs by the lateral offset Δy from the ideal position (line 10) with reference to the degree of freedom of movement in the y direction, so that the longitudinal axis 54 of the first line sensor 4 is offset by Δy in the negative y direction.

Since the region types a1-ai and, if need be, the region lengths d1-di can be detected regardless of the position of the first line sensor 4 in the y direction, the absolute position P is determined even when the lateral offset Δy is present, as described above with reference to FIG. 2b. The determination of the deviation from the ideal position in the form of the lateral offset Δy according to the invention is described below with reference to FIGS. 3a and 3b.

FIG. 3b shows the detail 53 from the first 2D pattern 5 from FIG. 3a in enlarged form. The detail 53 shows parts of the region a2 having the pattern elements 6d-6f and the region a3 having the pattern elements 6a-6c and, in-between, the region boundary 15b. The pattern elements 6a-6f are scanned on a sub-portion ΔL of the scanning length L at the points 55a-55f. On account of the arrangement or orientation of the pattern elements 6a-6f, the situation of the scanning points 55a-55f within the scanning length L is dependent on the lateral offset Δy, i.e. if the first line sensor 4 is offset in the y direction relative to the first 2D pattern 5 while position P remains constant, then the scanning points 55a-55f "migrate" along the x direction on the sensor array 24. Hence, the lateral offset Δy can be determined in a position P that is determined or determinable on the basis of the associated first code word, e.g. from the position of the scanning points 55a-55f that sense the pattern elements 6a-6f of the first code word within the scanning length L. For this purpose, the scan signal corresponding to the first code word is evaluated by the control and evaluation unit 2 on the basis of information stored therein.

By way of example, the position P in the direction of advance F to be determined on the basis of the first code word has a piece of information about the scan signal in the ideal position stored for it, e.g. about the distribution or the intensity of the individual signals or groups of signals from the detectors of the first line sensor 4. The scan signal actually produced and corresponding to the first code word in this position P is compared with this "ideal" scan signal, to which end the associated "ideal" scan signal is looked up on the basis of the first code word. The comparison of the actually produced scan signal with the "ideal" scan signal determines the lateral offset Δy on the basis of the stored information. Since the placement of the individual detectors in the linear array is known, the signals from those detectors that scan those pattern elements 6 forming the first code word on the scanning length L (that is to say those detectors that correspond to the scanning points 55a-55f), for example, are used to determine the offset Δy. For example, the pattern elements 6a-6f, in the ideal position (line 10), are scanned by the detectors with the placement a, a+3, a+6, a+8, a+10 and a+12 in the linear array (a: arbitrary natural number). If, in the position P, the pattern elements 6a-6f in the position P are actually scanned by the detectors a+1, a+4, . . . , a+13, the information stored in the control and evaluating unit 2 about the linear array is used to compute the lateral offset Δy therefrom or to look it up using a table produced in a calibration process. Alternatively, the pattern elements 6 form, on the whole length in the y direction of the first 2D pattern 5, in each case on a scanning length L, a first code word that codes not only the position P but also the offset Δy. In other words, there are in each case a plurality of first code words that code the same absolute position P, but a different offset Δy.

The determination of the lateral offset Δy is clarified further using the example that follows: The pattern elements 6 of the region a2, including the pattern elements 6d-6f under consideration, are such that they can be described mathematically within a prescribed coordinate system by the following parameterized rule stored in the control and evaluation unit 2

$$f_i(x)=x+42-13i \ (i: \text{integer}) \quad (1)$$

(for example the sequential parameter i is i=1 for the pattern element 6f, i=2 for the pattern element 6e and i=3 for the pattern element 6d).

The pattern elements 6 of the region a3, including the pattern elements 6a-6c under consideration, can be described by the following parameterized rule, which is likewise stored, with the running parameter j $$g_j(x)=10j-x \ (j: \text{integer}) \quad (2).$$

On the basis of this known information specific to the region a2 or a3, it is possible to use the distances—ascertained as below—between sensed pattern elements 6a-6f to infer the lateral offset Δy. The distances are ascertained by forming the difference between the placements of the detectors sensing the pattern elements 6a-6f, this difference corresponding to the difference between the digital values associated with the focuses of the scanned pattern elements 6a-6f. Assuming that the focuses of the scanned pattern elements 6a-6f are measured or sensed as digital values 28, 18, 8, −1, −14, −27 for the points 55a-55f in the case of randomly chosen units, subtraction of adjacent values yields the following three different difference values Δ1, Δ2, Δ3 for the distances between the points 55a-55f: 28−18=18−8=10=Δ1,   8−(−1)=9=Δ2,   −1−(−14)=−14−(−27)=13=Δ3.

The information stored in the control and evaluation unit 2, that is to say from the equations (1), (2) and the ascertained distances Δ1, Δ2, Δ3, is used to assign the digital values 28, 18, 8 to the pattern elements 6a-6c or the region a3. The values −1, −14, −27 are assigned to the pattern elements 6d-6f or the region a2. The values −1, −14, −27 are inserted, on the basis of this assignment information, into the equation (1) that applies for the region a2, and the values 28, 18, 8 are inserted into the equation (2) that applies for the region a3, as a result of which, ideally, the same equation $$f_i(x)=15-13i \quad (3)$$

is obtained for each value for the region a3 and the same equation $$g_j(x)=10j-8 \quad (4)$$

is obtained for each value for the region a2 (if measurement uncertainties mean that the insertion of the measured values into equation (1) or (2) yields slightly different results for the individual values of the same region a3 or a2, averaging and suitable quantization are performed).

Since the sensor has the same offset Δy regardless of the region under consideration, that is to say for both regions a2 and a3, the two equations (3) and (4) describe the same y positioning of the line sensor 4 relative to the 2D pattern 5. They can therefore be equated:

$$y=f_i(x)=g_j(x)=15-13i=10j-8 \quad (5).$$

This can be used to produce a system of linear congruencies, the following being obtained for the part from (5) that belongs to the rule $f_i(x)$:

$$y \bmod 13 = 15 \bmod 13 = 2 \quad (6).$$

For the part from equation (5) that belongs to the rule $g_j(x)$, the following is obtained:

$$y \bmod 10 = -8 \bmod 10 = 2 \quad (7).$$

The equation system (6), (7) with its infinite number of solutions is resolved according to the known procedure using the Chinese remainder theorem, which results in equation (8), which describes the sought discrepancy in the y direction:

$$y=2+130k \quad (8)$$

(LCM: lowest common multiple; k: integer).

The result, the number "130", results in the lateral offset Δy being able to be unequivocally determined within a length interval of 130 (of the randomly chosen) units. If a unit is 10 μm, for example, then according to the example it is thus possible to unequivocally determine deviations from the ideal position Δy of ±650 μm. If a lateral offset Δy going beyond that actually existed for the sensor, this lateral offset would no longer be able to be unequivocally determined on account of the ambiguity of the solution. However, such a resolution is normally adequate for deviations Δy that arise in practice. Otherwise, the use of one or more further regions a1-ai allows the determination of a lateral offset Δy within a greater length interval.

The example has been kept very simple for reasons of comprehensibility. As an alternative to the illustration, the pattern elements 6 of a region have a different inclination and/or varying distances in relation to one another. As a further alternative, the pattern elements 6 have, rather than a straight profile, a sinuous or curved and/or interrupted, discontinuous profile that is known through computation or calibration and is stored in the control and evaluation unit 2 in tabular or functional form.

FIG. 4a shows a plan view, in comparison with FIG. 2b, of a skew in the first line sensor 4 about the z axis. The first line sensor 4 is rotated about its center 14 from its ideal position (line 10) by the rotation angle α. In order to determine the position P and the skew or the rotation angle α, the scan signal or the first code word that codes the position P is stored in the control and evaluation unit as a function of the rotation angle α. To this end, the functional dependency of the scan signal on the rotation angle α is stored in the control and evaluation unit as a computation rule or table for lookup. Either one functional dependency per code word or per group of code words is used or, advantageously when only relatively small deviations from the ideal situation arise, a single functional dependency for all code words. In this case, the computation rule or table is, if need be for each scan signal or each first code word, computed from knowledge of the whole first 2D pattern 5 or determined in a calibration pass. On the basis of the functional correlation determined in this manner, the position P and the rotation angle α are ascertained in the position P from the scan signal in the skewed orientation of the first line sensor 4.

FIG. 4b shows tilting of the first line sensor 4 about the x axis from the ideal position (line 9). It shows a front view (x axis orthogonal in relation to the plane of the drawing). The first line sensor 4, the longitudinal axis of which extends orthogonally in relation to the plane of the drawing, is tilted from its ideal position (line 9) about the x tilt angle β, or in other words skewed about the x axis by the x tilt angle (3. The position P and the tilt or the x tilt angle β are determined in a similar manner to the procedure shown in FIG. 4a: The scan signal or the first code word that codes the position is stored in the control and evaluation unit 2 in the form of a computation rule or table as a function of the x tilt angle β. The functional dependency is likewise, as described above, ascertained per scan signal or for a plurality of or for all scan signals, specifically by computation or by means of a calibration pass. Optionally, the production of the functional correlation between scan signal and x tilt angle β takes account of the signal amplitude of the respective detector signal from the individual detectors in this case if, on the basis of the physical operating principle used for scanning, the intensity or amplitude of the detector signal from a detector is (uniquely and detectably) dependent on the distance thereof in relation to the first 2D pattern 5. In the position P, the functional correlation is used to ascertain the position and the x tilt angle β from the scan signal in the tilted orientation of the first line sensor 4.

FIG. 4c shows tilting of the first line sensor 4 about the y axis from the ideal position (line 12) in a side view, the longitudinal axis 54 of the first line sensor 4 in the ideal position (line 12) running parallel to the plane of the first 2D pattern 5 in the x direction. The position P and the tilt or the y tilt angle γ are determined in a manner similar to the procedure shown in FIGS. 4a and 4b. Optionally, in a manner similar to the procedure shown in FIG. 4b, the production of the functional correlation between scan signal and y tilt angle γ takes account of the signal amplitude of the respective detector signal from the individual detectors in this case. In the case of an optical measurement principle, the width, "seen" by a detector, of a respective pattern element 6 in the form of a line is compared with the stored width in the ideal position (line 12), from which the distance in the z direction of the respective detector in relation to the first 2D pattern 5 is inferred. In the case of a capacitive measurement principle, the distance dependency of the capacitance formed by the pattern electrodes and sensor electrodes is used. Such an approach taking account of the signal amplitude of the respective detector signal from the individual detectors is optionally also used in order to additionally or alternatively determine, as a further deviation from the ideal position, the offset in the z direction of the first line sensor 4, i.e. the distance of the first line sensor 4 in relation to the first 2D pattern 5 as the distance of its sensor center 14 in relation to the first 2D pattern 5.

Figure 5A:
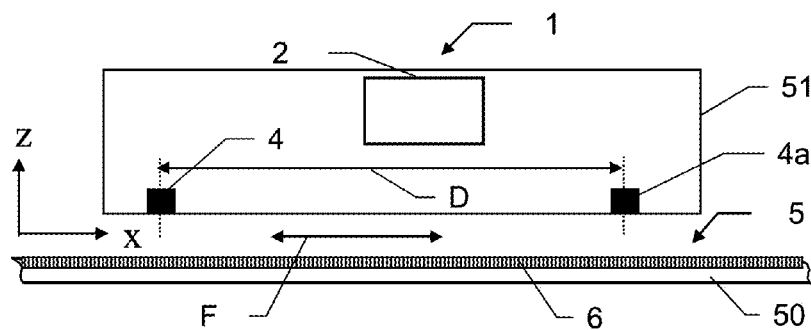
FIG. 5a, b show schematic illustrations of a system according to the invention with two line sensors.
Figure 5B:
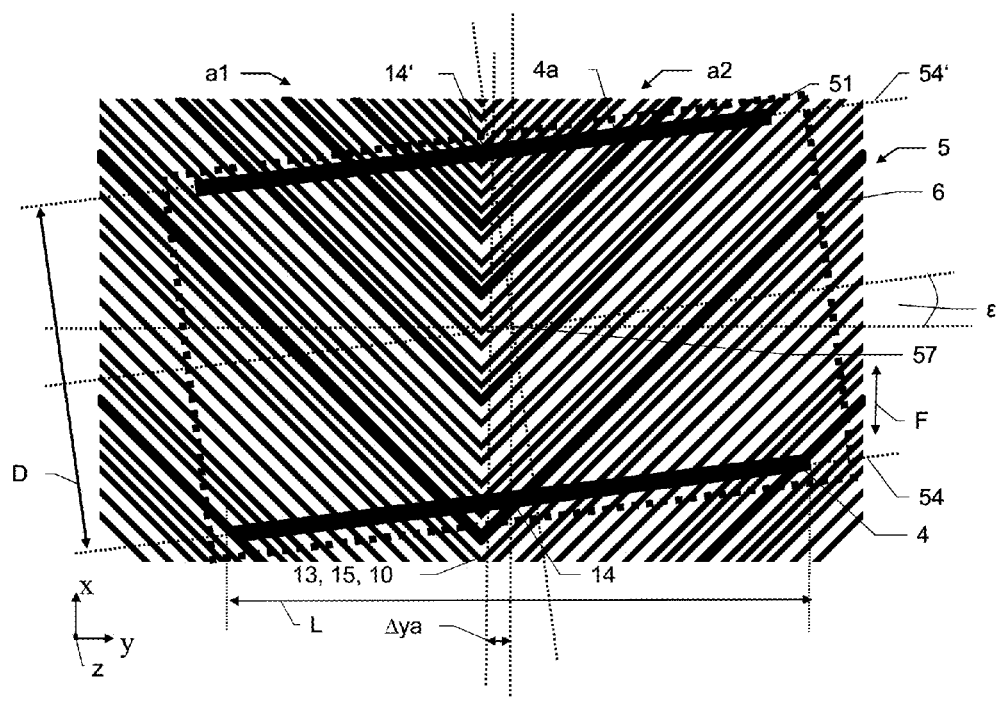

FIGS. 5a and 5b show a development for a system 1 according to the invention in which the first scanning head 51 has, besides a first line sensor 4 oriented approximately orthogonally in relation to the direction of advance F, a second line sensor 4a, which is likewise oriented approximately orthogonally in relation to the direction of advance F. FIG. 5a shows a schematic illustration, in a side view, of the system 1 having pattern support 50, which has the first 2D pattern 5 with pattern elements 6, and having the first scanning head 51, which has the control and evaluation unit 2 and the two line sensors 4 and 4a in an ideal position relative to the first 2D pattern 5. The two line sensors 4 and 4a are oriented approximately parallel to one another and mounted in succession in the direction of advance F in the first scanning head 51, which is why they are at a fixed line sensor distance D as the distance of the two line sensor centers 14 and 14' in relation to one another. Alternatively, the first and second line sensors 4 and 4a are arranged at a fixed line sensor distance in the direction of advance F beside one another or with a parallel offset in relation to one another (in a manner similar to the illustration shown in FIG. 2c).

The line sensor distance D is known and stored in the control and evaluation unit 2. The second line sensor 4a, like the first line sensor 4, is designed to scan the first 2D pattern 5 and to produce a scan signal that corresponds to the first code word formed by the pattern elements 6 that are each scanned by the second line sensor 4a. In this case, the scan signal can be used to determine the absolute position coded by the scanned first code word and a deviation from the ideal position of the second line sensor 4a in respect of the first 2D pattern 5 on the basis of the first code word. When there are two line sensors 4, 4a arranged at a distance in the direction of advance F, the position to be determined, as the position of the first scanning head 51, is formed e.g. as a mean value from the two absolutely determined positions of the two line sensors 4 and 4a, or a position determined by one line sensor 4 or 4a is specified more precisely by the position value from the other line sensor 4a or 4. Hence, the use of two line sensors 4 and 4a affords advantages in respect of the accuracy and/or robustness of the position finding.

FIG. 5b shows a plan view of a sub-region of the system 1 according to the invention that is shown in FIG. 5a. It shows the first 2D pattern 5, which is scanned by the first line sensor 4 and by the second line sensor 4a that are integrated in the indicated first scanning head 51. The first and second line sensors 4 and 4a have the same scanning length L. Alternatively, the scanning lengths are of different magnitude. The first 2D pattern 5 has pattern elements 6 that are embodied as straight lines of different width and a complementary physical property (in the optical case, opaque/transparent, reflective/non-reflective). They form first code words by means of a defined regularly varying or pseudo random sequence that differs in a defined manner and an embodiment that can be distinguished in a defined manner (in the example, the different width). Alternatively, the pattern elements 6 are embodied not as straight lines, as shown, but rather as curved lines, with optionally the width and/or physical property of a pattern element 6 varying continuously.

In contrast to FIG. 5a, the first scanning head 51 and hence the two line sensors 4 and 4a are not in the ideal position (line 10) relative to the first 2D pattern 5, but rather the first scanning head 51 is offset by the absolute value Δya in the positive y direction and skewed about the z axis by the rotation angle ε. For the purpose of determining deviations from the ideal position (line 10) of the first and second line sensors 4 and 4a in relation to the first 2D pattern 5, the pattern elements 6 are in an inclined orientation, and separated into two groups of pattern elements 6 having different inclination, such that a v-shaped first 2D pattern 5 is formed with an axis of symmetry 13 as the region boundary 15 between a first region a1 (shown on the left) with pattern elements 6 having the first inclination and a second region a2 (shown on the right) with pattern elements 6 having the second inclination. Preferably, a respective first code word is formed on the basis of pattern elements 6 from the two regions a1 and a2, i.e. a scan signal corresponding to a first code word is produced by virtue of pattern elements 6 of the first (left-hand) region a1 and pattern elements 6 of the second (right-hand) region a2 each being scanned by a respective line sensor 4 or 4a. In order to allow determination of the position P despite a lateral offset Δya that is shown for the first scanning head 51, pattern elements 6 symmetrically about the axis of symmetry 13 of the first 2D pattern 5 form a first code word on a y length, which is shorter than the scanning length L of the line sensors 4 and 4a, so that a scan signal corresponding to the first code word is always produced even in the case of scanning in a lateral offset Δya. In this case, the y length of the first code word is attuned to a maximum possible lateral offset $\Delta ya_{max}$. Alternatively, the pattern elements 6 on the whole extent of the first 2D pattern 5 in the y direction each form a first code word on a scanning length L, each of said first code words independently coding the position P to be determined. This involves the same first code word or different first code words in each case, the corresponding scan signals of said code words all being associated with the same position P. For the purpose of determining position and discrepancy when there is a skew or tilt, the scan signal or the first code word that codes the position P is stored in the control and evaluation unit as a function of the rotation angle (in this case: ε) as a computation rule or table for lookup (see description pertaining to FIG. 3a).

The deviation(s) of the first scanning head 51 is or are determined on the basis of the respective deviation(s) from the ideal position of the first line sensor 4 and the second line sensor 4a and the known line sensor distance D. In the example, as mentioned, the first scanning head 51 has a deviation from an ideal position (line 10) insofar as, on the one hand, it is skewed about the scanning head center 57 in respect of the z axis by the angle c and, on the other hand, the scanning head center 57 is laterally offset (in the y direction) by an absolute value Δya. The skew or the rotation angle c and the lateral offset Δya are ascertained on the basis of the respective lateral offset of the first and second line sensors 4 and 4a in light of the line sensor distance D. Alternatively or additionally, the rotation angle c is determined on the basis of the skew in the first and/or second line sensor(s) 4 and 4a about the z axis. Accordingly, a skew about the x axis or a tilt, i.e. tilt about the y axis, in the first scanning head 51 is ascertained on the basis of the tilts or skews about the x axis in the two line sensors 4 and 4a. The deviations from an ideal position for the first and second line sensors 4 and 4a relative to the first 2D pattern is in this case provided analogously to the descriptions pertaining to FIGS. 3a-4c.

The use of two line sensors 4 and 4a at a distance means that it is possible to determine deviations of the first scanning head 51 from a well-defined position and orientation relative to the first 2D pattern 5 even more accurately than with just one first line sensor 4, wherein, for highly accurate applications, deviations of the first scanning head 51 from an ideal position are determined through the use of two line sensors 4 and 4a in respect of all degrees of freedom of movement. The absolute position, which likewise needs to be determined, of the first scanning head 51, e.g. as the position of the scanning head center 57 relative to the first 2D pattern, is formed e.g. as a mean value from the two absolutely determined positions of the two line sensors 4 and 4a, which affords advantages in respect of the accuracy of the determination of the position of the first scanning head 51. The use of two line sensors 4 and 4a is also advantageous in respect of the robustness of the position finding.

Figure 6A:
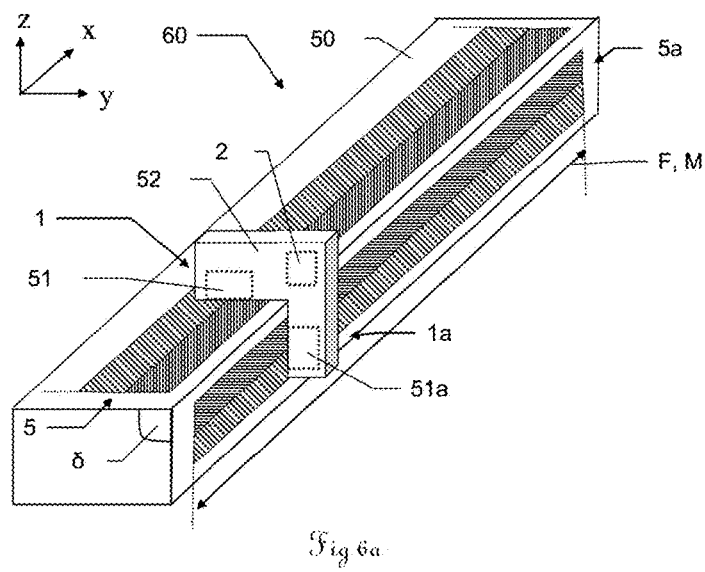
FIG. 6a, b show perspective schematic illustrations of embodiments of a measuring apparatus according to the invention.

Systems 1 according to the invention are particularly suitable for measuring apparatuses 60 such as absolute linear encoders or linear position encoders in which the position of elements that are movable along a measurement path relative to one another needs to be determined. FIG. 6a shows a schematic illustration of an advancement for such a measuring apparatus 60 in a perspective view. The measuring apparatus 60 has a first system 1 according to the invention having a first scanning head 51 and a first 2D pattern 5, and a second system 1a according to the invention having a second scanning head 51a and a second 2D pattern 5a. The first 2D pattern 5 and the second 2D pattern 5a are set on a common three-dimensional pattern support 50. The two scanning heads 51 and 51a each have at least one line sensor for scanning the respective 2D pattern. In the example, the two scanning heads 51 and 51a and the control and evaluation unit 2 are integrated as a common control and evaluation unit for both systems 1 and 1a in an object 52, the position P of which in the direction of advance F along the measurement path M needs to be determined, wherein the two scanning heads 51 and 51a have a fixed and known spatial arrangement in the object and hence in relation to one another.

The properties, according to the invention, of the second 2D pattern 5a and of the second scanning head 51a correspond to those of the first 2D pattern 5 and the first scanning head 51, so that the 2D patterns 5 and 5a can each be used to determine a position P absolutely and to determine a deviation from an ideal position for the line sensor(s) and hence for the respective scanning head 51 or 51a or for the object 52 relative to the respective 2D pattern 5 or 5a. The 3D pattern support 50 has at least three sides, the edges of which are parallel to one another, so that the 3D pattern support corresponds to a straight prism having a triangular or otherwise polygonal cross section (in FIG. 6a, a cuboid), with at least two sides of the 3D pattern support 50 having a 2D pattern on them, as shown in the example. As a result, the first and second 2D patterns 5 and 5a are situated in two different, nonparallel planes and extend parallel to one another in the direction of advance, so that the second 2D pattern 5a is arranged at an angle δ, situated in the zy plane, in relation to the first 2D pattern 5. In the example, the arrangement of the first 2D patterns 5 and 5a is chosen such that the first 2D pattern 5 is situated in an xy plane and the second 2D pattern 5a in a zx plane. Hence, the two pattern planes intersect at an angle δ of 90°. It has been found that good results can be attained with an angle in the region of approximately 20°<δ<120°.

On account of the properties, according to the invention, of the first and second 2D patterns 5 and 5a and the different orientation thereof in space and also the fixed and known spatial arrangement of line sensors and scanning heads 51 and 51a relative to the object 52, the position of the object 52 and a deviation from an ideal position for the object 52 relative to the pattern support 50 can be determined in respect of all degrees of freedom of movement. For example, the first 2D pattern 5 is used to determine a lateral offset in the y direction and the second 2D pattern 5a is used to determine a lateral offset in the z direction, so that overall an offset in the object 52 in the yz plane, that is to say transversely in relation to the direction of advance F, can be determined. Accordingly, skews and tilts in the object 52 are determined on the basis of the skews and tilts in the first scanning head 51 and the second scanning head 51a.

Since determination of the deviation from an ideal position for the object 52 involves there being two 2D patterns 5 and 5a anyway, an absolute position P in the direction of advance F is determined both using the first system 1 and using the second system 2 or both on the basis of the first 2D pattern 5 and on the basis of the second 2D pattern 5a, which affords advantages in respect of the robustness and/or accuracy of the position finding. A further increase in the robustness and/or accuracy is optionally achieved by the use of a further system according to the invention having a 2D pattern on a further side of the pattern support 50, which 2D pattern extends parallel to the first two in the direction of advance F.

Figure 6B:
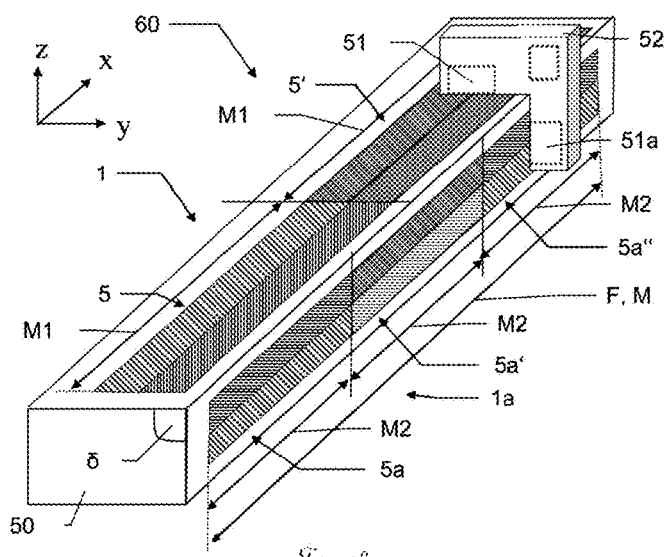

FIG. 6b shows an alternative advantageous use of a measuring apparatus 60 according to the invention, which has two systems 1 and 1a according to the invention, for position finding along a measurement path M. It schematically shows a perspective view of a 3D pattern support 50 having two lateral faces that are perpendicular to one another and that extend in the direction of advance F, with one lateral face having patterned measurement paths M1 with two first 2D patterns 5, 5' according to the invention and the other lateral face having patterned measurement paths M2 with three second 2D patterns 5a, 5a' and 5a" according to the invention. The 2D patterns 5-5a" are each shorter than the whole measurement path M on which the relative position of the object 52, subsequently called the measurement path position PM, needs to be determined. The first 2D patterns 5 and 5' are arranged in succession in the direction of advance F and are identical to one another. They have, in the direction of advance F, a pattern length M1 that is proportioned such that the arrangement of the two first 2D patterns 5 and 5' in the direction of advance F covers the whole measurement path M. Similarly, three second 2D patterns 5a-5a", which are identical to one another, are located in succession in the direction of advance F and each cover a length M2 of the measurement path M. The first and second 2D patterns 5, 5' and 5a-5a" extend parallel to one another in the direction of advance F, so that along the measurement path M a first 2D pattern 5 or 5' is scanned by the first scanning head 51 of the first system 1, and at the same time a second 2D pattern 5a, 5a' or 5a" is scanned by the second scanning head 51a of the second system 1a in each case. According to the invention, each first 2D pattern 5, 5' forms respective first code words, and each second 2D pattern forms respective second code words, which code positions on the length M1 or M2 of the respective pattern 5, 5' or 5a-5a" absolutely and uniquely. Since the first 2D patterns 5 and 5' and the second 2D patterns 5a-5a" are each identical to one another, the respective first and second code words occur twice (first 2D pattern) and three times (second 2D pattern), respectively, on the whole measurement path M. The pattern lengths M1 and M2 are now chosen differently, and in a manner attuned to one another, such that along the whole measurement path M, when a first pattern 5 or 5' and a second pattern 5a-5a" are scanned in the same relative position of object 52 in relation to pattern support 50, a code word combination as a combination of a first code word of the first pattern 5 or 5' and a second code word of the second pattern 5a, 5a', 5a" occurs only once. As a result, this code word combination is unique and is thus used for absolute determination of the measurement path position PM of the object 52. The absolute determination of the measurement path position PM is effected on the basis of the code word combination of the first and second code words by means of information stored in the control and evaluation unit 2 such as an association table comprising measurement path positions PM and code word combinations or comprising measurement path positions PM and combinations of the respective scan signals corresponding to the first and second code words, or an association table comprising measurement path positions PM and the combinations of the positions that are each associated with the first code word and the second code word.

For the sake of better clarity, FIG. 6b shows first and second 2D patterns of greatly different length. Preferably, however, as a departure from the illustration in FIG. 6b, the difference between the pattern length M1 of the first 2D pattern 5 or the difference in the number of the first code words is as small as possible, and the pattern length M2 or the number of the second code words of the second 2D pattern 5a is minimal and the pattern lengths M1, M2 or the numbers of code words coprime in relation to one another, which advantageously results in a number of codable measurement path positions PM that is as large as possible. By way of example, the first 2D pattern 5 has 1024 first code words on the pattern length M1 and the second 2D pattern 5a has 1023 second code words on the pattern length M2.

Hence, there are 1024·1023=1047552 possible combinations of a first code word of the first pattern 5 with a second code word of the second pattern 5a. This means that the measurement path M can be split into 1047552 determinable positions. If each of the coded, discrete positions corresponds to one measurement path portion of e.g. 100 μm, this therefore results in a measurement path M of 104.7552 m for pattern lengths M1 and M2 of 10.24 cm and 10.23 cm, respectively.

The measurement path position PM, that is to say the relative position of the object 52 on the measurement path M, is determined absolutely from the absolute positions P in relation to the pattern lengths M1 and M2 optionally by producing and solving a system of linear congruencies, preferably using the Chinese remainder theorem. If, in a relative position for object 52, the 500$^{th}$ first code word, for example, is scanned from the first 2D pattern 5, which has 1024 code words, and the 600$^{th}$ second code word is scanned from the second 2D pattern, which has 1023 code words, then a system of linear congruencies is obtained from the two equations (9) and (10) for the sought measurement path position PM:

$$PM \bmod 1024 = 500 \tag{9}$$

and $$PM \bmod 1023 = 600 \tag{10}$$

The measurement path position PM is computed from equations (9) and (10) to obtain $$PM = 600 \cdot 1024 + 500 \cdot (1047552 - 1023) \bmod 1047552 = 102900 \tag{11}$$

Such a measuring apparatus 60 is advantageous particularly in the case of long measurement paths M, i.e. in the case of a measuring apparatus 60 with a long travel, since less complex code words are necessary for 2D patterns, which code positions on a length M1 or M2 absolutely, than in the case of a single absolute coding, which needs to provide unique first and second code words for the whole measurement path M. In addition, shorter pattern lengths M1, M2 afford advantages in respect of production, transport and/or assembly of the pattern. For example, instead of on a common, long pattern support 50, as shown in FIG. 6b, the first 2D patterns 5, 5' are set on separate, short pattern supports that are assembled on one side of the measuring apparatus 60 in succession in the direction of advance and also the second 2D patterns 5a-5a" are set on further separate, short pattern supports that are assembled, in addition to the pattern supports for the first 2D patterns 5, 5', optionally on another side of the measuring apparatus 60, in succession in the direction of advance on the measuring apparatus. In this case, the first 2D patterns 5, 5' extend parallel to the second 2D patterns 5a-5a" as when fitted on a common 3D pattern support 50. So as advantageously also to be able to tolerate production tolerances, and of these particularly inaccuracies in the assembly of such individual pattern supports, the first 2D pattern 5 and the second 2D pattern 5a differ somewhat more than just by one code word. If, by way of example, ten pattern supports having first 2D patterns 5 and, in parallel with these pattern supports, correspondingly ten pattern supports having second 2D patterns 5a are each assembled in succession in the direction of advance F with an accuracy of 100 μm in each case, then an inaccuracy of 1 mm is obtained in the direction of advance F overall. In order to be able to compensate for this when the 2D patterns 5 and 5a are divided into coded positions to give 100 μm in each case, the second 2D pattern 5a, given a first 2D pattern 5 with 1024 code words, has 1024−11=1013 code words instead of 1023 code words. In order to be able to tolerate the inaccuracy of up to ten positions, the maximum number of code word combinations to which a measurement path position PM can be uniquely assigned, taking account of the inaccuracy in each case, is:

$$1024 \cdot \left\lfloor \frac{1031}{11} \right\rfloor = 94208$$

On the basis of the above assumptions, this corresponds to a maximum measurement path of 9.4208 m on which the object 52 can be unequivocally localized absolutely. This is much shorter than the maximum possible measurement path without tolerance, of 1024·1013=1037312 units or 103.7312 m. Therefore, to increase the size of the maximum measurement path M while tolerating inaccuracies, optionally further 2D patterns having a further pattern length, which is different from the pattern lengths M1 and M2, are fitted parallel to the first and second 2D patterns 5 and 5a along the measurement path M. Optionally, a respective scanning head 51 or 51a also has at least one further line sensor, that is to say at least two or three line sensors, in order to increase the robustness of the system 1, 1a or of the measuring apparatus 60.

Figure 7:
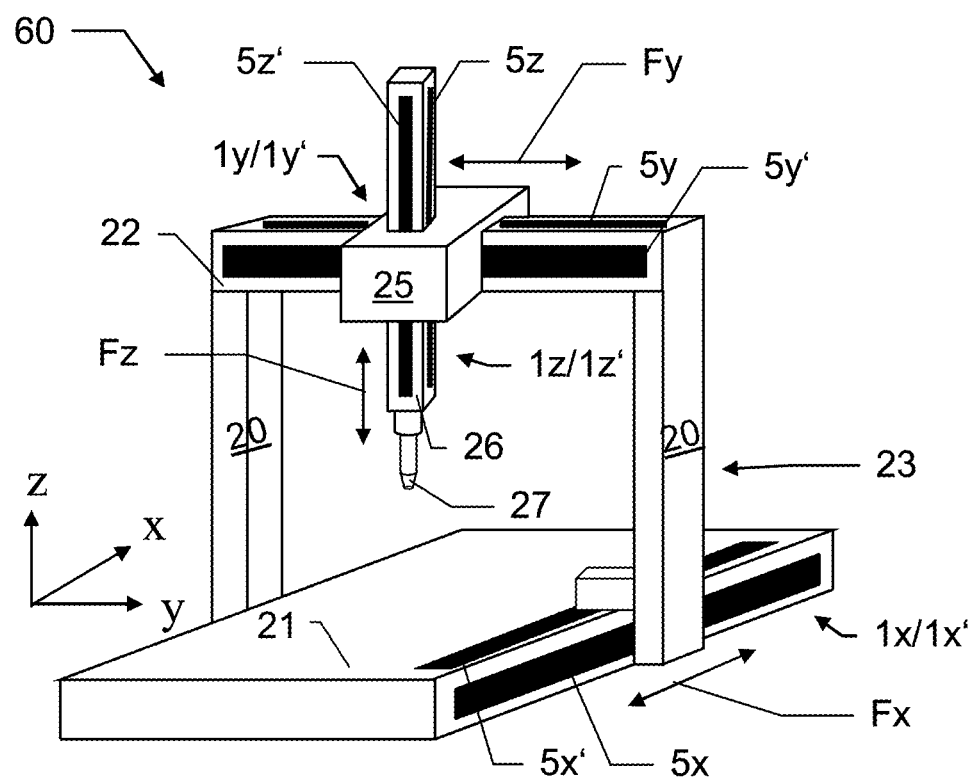
FIG. 7 shows a perspective schematic illustration of a measuring apparatus in the form of a coordinate measuring machine.

FIG. 7 shows a measuring apparatus 60 according to the invention that is in the form of a coordinate measuring machine (CMM). The CMM 60 is designed to determine the position of an optical or tactile scanning tip 27 in space. It has a plate-like base 21 that spans an x-y plane and on which a portal 23 having two portal supports 20 is arranged such that the portal is movable relative to the base 21 in the x direction. The portal 23 additionally has a bridge 22 and a Z column 26, the portal supports 20 being connected to one another via the bridge 22 at their ends that are remote from the base. The bridge 22 has a slide 25 arranged on it that is movable relative to the bridge 22 in the y direction. The Z column 26 is movable relative to the slide 25 in the z direction, is guided in a holder in the slide 25 and, at its end facing the base 21, has the scanning tip 27. The direction of the respective relative movement of portal 23, slide 25 and Z column 26 defines a respective direction of advance Fx, Fy, Fz along which in each case at least one, in the example in each case two, system(s) according to the invention 1x and 1x', 1y and 1y', 1z and 1z' can determine a position (for the portal with respect to the base, for the slide with respect to the bridge, for the Z column with respect to the slide). The systems 1x and 1x' are integrated in the CMM 60 such that the base 21 has the first 2D pattern 5x or the second 2D pattern 5x' and the portal 23 has the first scanning head or the second scanning head for scanning the 2D pattern 5x or 5x'. Similarly, the further systems 1y or 1y' and 1z or 1z' are integrated in the CMM 60 such that the scanning heads thereof with the slide 25 are movable relative to the 2D patterns 5y/5y' and 5z/5z' that are set on the bridge 22 and the Z column, respectively. As an alternative to the use of 2D patterns 5x-5z' that each cover the whole possible measurement path in the x, y or z direction, 2D patterns 5 arranged in succession in each direction of advance Fx, Fy, Fz and having a shorter pattern length are used, that is to say systems 1x-1z' that are in a form similar to those shown in FIG. 6b. From the positions PX, PY and PZ and deviations from the ideal positions situations of the scanning heads 51x-51z', as determined according to the invention, it is possible to ascertain the spatial position of the scanning tip 27 absolutely and with a high level of precision. The present invention thus allows high-precision determination of the spatial position of the scanning tip 27 by virtue of the absolute position and deviation determination even without high-precision design or production of the CMM 60 and/or without complex high-precision methods for calibrating the CMM 60. On the other hand, the absolute position and deviation determination according to the invention allows the spatial position of the scanning tip 27 to be determined even more precisely with such design or calibration complexity than in the case of measuring apparatuses based on the prior art.

What is claimed is:

1. A system for determining positions along a direction of advance, the system comprising:
    a first sensor having a scanning length along a longitudinal axis, which first sensor is used for scanning a first 2D pattern and producing a scan signal and is integrated in a first scanning head,
    the first 2D pattern that can be scanned by the first sensor, extends in the direction of advance and consists of pattern elements, wherein the first sensor and the first 2D pattern are mobile relative to one another in the direction of advance, and
    a control and evaluation unit for evaluating the scan signal,
wherein:
    the pattern elements form an associated first code word for each position along the direction of advance by virtue of arrangement and/or embodiment that is/are different by definition, which first code word can be sensed in each case at least on a portion of the scanning length of the first sensor and which first code word codes the respective position absolutely, so that the first 2D pattern forms an absolute position code trace in the direction of advance,
    the scan signal in the respective position corresponds to the first code word in each case, and
    the control and evaluation unit stores the following information:
        a piece of decoding information that can be used to explicitly associate an absolute position with each scan signal, and
        information that can be used to determine, on the basis of the first code word, in the respective position, using the respective scan signal, a discrepancy in the first sensor from an ideal situation relative to the first 2D pattern at least in respect of a degree of freedom of movement.

2. The system according to claim 1, wherein the first sensor is in the form of a line sensor.

3. The system according to claim 1, wherein:
    the longitudinal axis of the first sensor is oriented approximately in the direction of advance and the first code words of the first 2D pattern have, in the direction of advance, pattern elements in a different arrangement, with a different inclination in relation to the direction of advance and different pattern element periodicities, and/or pattern elements in a different embodiment.

4. The system according to claim 3, wherein
    the first 2D pattern is split, in the direction of advance, into a multiplicity of respectively adjoining regions of pattern elements in a different arrangement and/or embodiment,
    wherein:
        the regions have different region lengths in the direction of advance, each region having pattern elements in a defined embodiment and/or arrangement forms a region type and the first 2D pattern has at least two different region types, and the scanning length of the first sensor is attuned to the region lengths of the regions in the direction of advance such that the first sensor can simultaneously scan pattern elements from at least two regions in each position, and the sequence of the region types of the regions that can be scanned on a scanning length is used to form a respective first code word.

5. The system according to claim 4, wherein
the regions have at least two different region lengths in the direction of advance, and
the region lengths in combination with the sequence of the region types, are used to form a respective first code word,
wherein the number of the different region lengths and the number of the region types that the first 2D pattern has are chosen in a manner attuned to one another.

6. The system according to claim 3, wherein
the first scanning head has an integrated second sensor oriented approximately in the direction of advance, for scanning the first 2D pattern, wherein the first sensor and the second sensor are arranged in relation to one another in a defined position, stored in the control and evaluation unit, at a sensor distance D1-D3 that is defined in the direction of advance and that is likewise stored in the control and evaluation unit, wherein the longitudinal axes of the two sensors are oriented approximately parallel to one another in the direction of advance.

7. The system according to claim 1, wherein the first scanning head has a second sensor for scanning the first 2D pattern, wherein
the longitudinal axis of the first sensor and the longitudinal axis of the second sensor are oriented approximately orthogonally in relation to the direction of advance, and
the first sensor and the second sensor are at, in the direction of advance, a defined sensor distance D that is stored in the control and evaluation unit, wherein the longitudinal axes of the first and second sensors are oriented approximately parallel to one another.

8. The system according to claim 7, wherein the control and evaluation unit stores information that can be used to determine, on the basis of the scan signals from the first sensor or line sensor and from the second sensor that correspond to a respective first code word, a discrepancy in the first scanning head from an ideal situation relative to the first 2D pattern at least in respect of a degree of freedom of movement, in respect of all degrees of freedom of movement.

9. A measuring apparatus having limbs that are movable relative to one another along a measurement path, wherein
a first system according to claim 1 is provided and the measurement path extends in the direction of advance of the system, wherein the system is used to determine the relative situation of the limbs in relation to one another, wherein the measuring apparatus is in the form of a linear encoder.

10. The measuring apparatus according to claim 9, wherein
at least one second system is provided having a second scanning head, which has at least one sensor or line sensor, and a second 2D pattern, which has second code words for determining an absolute position along the direction of advance and for determining a discrepancy in the sensor or line sensor from an ideal situation relative to the second 2D pattern, wherein the first 2D pattern and the second 2D pattern extend parallel to one another in the direction of advance, and are arranged in different planes, wherein specifically the planes form an angle of 90°±3°, and the first scanning head and the second scanning head are movable together.

11. The measuring apparatus according to claim 10, wherein
the first system has a plurality of like first 2D patterns fitted in succession in the direction of advance and the second system has a plurality of like second 2D patterns fitted in succession in the direction of advance, wherein the number of the first code words of the first 2D pattern and the number of the second code words of the second 2D pattern are coprime to each other and a difference in the numbers of code words in relation to one another, wherein specifically the difference in the numbers of code words is chosen on the basis of production tolerances of the measuring apparatus.

12. The measuring apparatus according to claim 10, wherein
each code word combination as a combination of a first code word of the first 2D pattern and a second code word of the second 2D pattern is unique along the direction of advance, and in that a control and evaluation unit of the measuring apparatus stores information that can be used to explicitly associate code word combinations with a measurement path position in each case, wherein the number of the first code words of the first 2D pattern and the number of the second code words of the second 2D pattern are attuned to one another such that production tolerances of the measuring apparatus can be compensated for.

13. The measuring apparatus according to claim 9, wherein the measuring apparatus is a 3D coordinate measuring machine, wherein the measuring device has at least one respective system for each coordinate axis for the purpose of determining the relative situation of the limbs in relation to one another.

14. A method for determining positions along a direction of advance using a system according to claim 1, the method comprising:
scanning pattern elements of the first 2D pattern by the first sensor on a scanning length,
producing a scan signal that corresponds to the first code word formed by scanned pattern elements,
associating an absolute position with the scan signal on the basis of decoding information stored in the control and evaluation unit, and
in the event of discrepancies in the scan signal from the ideal signal stored for this position, using the scan signal and information stored for this position in the control and evaluation unit on the basis of the first code word to determine a discrepancy in the first sensor from an ideal situation in respect of at least one degree of freedom of movement relative to the first 2D pattern.

15. The method according to claim 14, wherein
the discrepancy from an ideal situation is determined by solving a mathematical system of linear congruences that is produced on the basis of the first code word.

16. The method according to claim 14, wherein
the discrepancy from an ideal situation is determined by solving a mathematical system of linear congruences that is produced on the basis of the first code word using the Chinese remainder theorem.

17. The method according to claim 14, wherein
the first 2D pattern and a second 2D pattern are scanned in one step, and
code word combination from a first code word of the first 2D pattern and a second code word of the second 2D pattern is used to explicitly determine an absolute measurement path position.

18. The method according to claim 14, wherein
the first 2D pattern and a second 2D pattern are scanned in one step, and
code word combination from a first code word of the first 2D pattern and a second code word of the second 2D pattern is used to explicitly determine an absolute measurement path position by solving a mathematical system of linear congruences that is produced on the basis of the two code words, specifically by using the Chinese remainder theorem.

19. The method according to claim 14, wherein a 3D coordinate to be measured is computed from the absolute positions and discrepancies from the ideal situation that are determined for each coordinate axis.

20. A non-transitory computer program product that is stored on a machine-readable storage medium with program code, for controlling or performing the method according to claim 14.

* * * * *